(12) United States Patent
Suppes

(10) Patent No.: US 10,589,838 B1
(45) Date of Patent: Mar. 17, 2020

(54) MULTICOPTER WITH PASSIVELY-ADJUSTING TILTWING

(71) Applicant: Galen Suppes, Columbia, MO (US)

(72) Inventor: Galen Suppes, Columbia, MO (US)

(73) Assignee: The Suppes Family Trust, Columbia, MO (US)

( * ) Notice: Subject to any disclaimer, the term of this patent is extended or adjusted under 35 U.S.C. 154(b) by 0 days.

(21) Appl. No.: 16/565,775

(22) Filed: Sep. 10, 2019

Related U.S. Application Data

(60) Provisional application No. 62/879,003, filed on Jul. 26, 2019, provisional application No. 62/862,237, filed on Jun. 17, 2019, provisional application No. 62/860,152, filed on Jun. 11, 2019.

(51) Int. Cl.
| | | |
|---|---|---|
| *B64C 3/38* | (2006.01) |
| *B64C 29/00* | (2006.01) |
| *B64C 27/52* | (2006.01) |
| *B64C 27/00* | (2006.01) |
| *B64D 35/04* | (2006.01) |
| *B64C 9/04* | (2006.01) |
| *B64D 27/24* | (2006.01) |

(52) U.S. Cl.
CPC ............ *B64C 3/38* (2013.01); *B64C 3/385* (2013.01); *B64C 9/04* (2013.01); *B64C 27/001* (2013.01); *B64C 27/52* (2013.01); *B64C 29/0033* (2013.01); *B64D 27/24* (2013.01); *B64D 35/04* (2013.01); *B64C 2027/004* (2013.01)

(58) Field of Classification Search
CPC ................................. B64C 3/38; B64C 3/385
See application file for complete search history.

(56) References Cited

U.S. PATENT DOCUMENTS

| | | |
|---|---|---|
| 6,783,096 B2 | 8/2004 | Baldwin |
| 7,059,562 B2 | 6/2006 | Baldwin |
| 10,011,349 B2 | 7/2018 | Ivans et al. |
| 10,173,771 B2 | 1/2019 | Ivans et al. |
| 10,266,252 B2 | 4/2019 | Anderson et al. |
| 10,279,892 B2 | 5/2019 | Bosworth |
| 10,301,016 B1 * | 5/2019 | Bondarev ........... B64C 29/0033 |
| 10,370,100 B2 | 8/2019 | Rothhaar et al. |

* cited by examiner

*Primary Examiner* — Nicholas McFall

(57) ABSTRACT

Transitioning quadcopters and tricopters use passively adjusting tiltwings to reduce the number of actuators needed to control flight. Both transitioning copters can operate with four controlled actuators comprising four motor speeds for the quadcopter and three motor speeds and one rudder position for the tricopter.

11 Claims, 9 Drawing Sheets

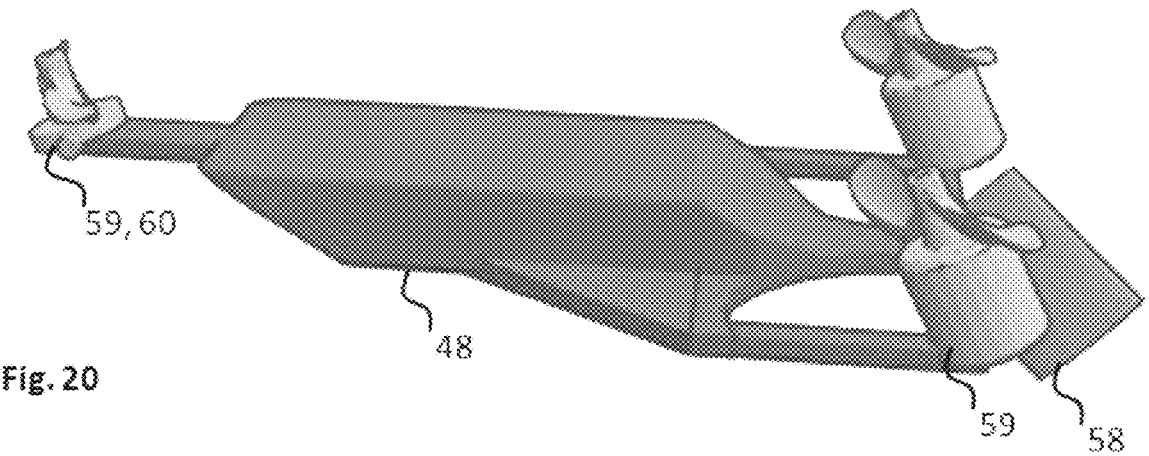

Fig. 20

|  | Hovering Flight (fixed-tilt rotors at tail) | Cruising Flight |
|---|---|---|
| Pitch | Rear motor speed [I] | Rear motor speed [I] |
| Roll/Level | 2nd rear motor speed [I] | 2nd rear motor speed [I] |
| Yaw | 2nd Front Motor speed [I] (Other flaps rudders [I])* | 2nd Front Motor speed [I] (Other flaps rudders [I])* |
| Velocity | N/A | Front motor speed [I] |
| Altitude | Front motor speed & history [I] | History of velocity vector |
| Dependent on history and other settings are: Angle of thrust wings, passively set L/D & Lift Ratio - lift from wings body vs. lift from thrusters propellers L/D ratios have a maximum value at any velocity which corresponds to a different pitch at each velocity. * If tricopter rather than quadcopter. NOTE: If the vehicle is at least X% (e.g. 80%) hover mode, the hover controls can be used to control pitch, roll, yaw, and altitude with velocity highly dependent on the steady-state attained at a pitch setting. A turn is a controlled yaw maneuver. | | |

Fig. 21

MULTICOPTER WITH PASSIVELY-ADJUSTING TILTWING

CROSS REFERENCE TO RELATED APPLICATIONS

This application is a continuation-in-part of Provisional Application Ser. No. 62/879,003 filed Jul. 26, 2019 entitled "Passively-Adjusting Tiltwing", Ser. No 62/862,237 filed Jun. 17, 2019 entitled "High Speed Drone", and Ser. No 62/860,152 filed Jun. 11, 2019 entitled "High Speed Drone". All of the above-listed applications are incorporated by reference in their entirety herein.

FIELD

The present invention relates to vertical takeoff and landing aerial vehicles capable of transitioning to the equivalent of fixed-wing flight. More specifically this invention relates to quadcopters and tricopters with tiltwings that passively transition one or two propellers to more-horizontal thrust vectors.

BACKGROUND

This invention is a vertical takeoff aerial vehicle with significantly improved energy efficiency as compared to other vertical takeoff aerial vehicles. Benefits include lower cost vehicles, passive flight stability features, and reduced energy consumption.

Low cruising energy efficiency is a problem of alternative vertical takeoff and landing (VTOL) aerial vehicles. Confinement to takeoff and landing is a problem with most fixed-wing aircraft.

A design objective of this invention is a transitioning VTOL that is simple, robust, light weight, and scalable. Herein, "passively controlled" and "Passively-Adjusting" refer to control without use of an actuator with a range of dampening features to promote stability. Dampening features can be as simple as the mass of an object that gives the object increased momentum or more complex like an automobile's shock absorber. An actuator includes but is not limited to devices such as electric motors and valves.

Actuators are known to be able move a propeller's motor relative to a fuselage. The term "statically" indicates that a motor is connected to a fuselage or wing in a set position relative to that fuselage or wing.

Related art includes such items as "freewings" which are typically wings that freely rotate along a spanwise axis and "tiltwings" which are typically wings with propellers or jets attached and are typically controlled in position by actuators. The tiltwings of the claims of this invention are passively controlled rather than actively controlled with actuators—often, passively controlled includes indirectly controlling such as using a propeller to change vehicle velocity relative to air wherein the relative velocity of air controls tiltwing position.

A tiltwing has both a thrust vector and lift-generating wing-like surfaces. A tiltwing may be comprised of a single wing having a wingspan many times larger than the width of the fuselage. Alternatively, the tiltwing may be comprised of two smaller wings connected by a shaft that goes through the vehicle. Alternatively, a tiltwing may be comprised of a with having a width similar to the fuselage and positioned in front of the fuselage.

SUMMARY OF THE INVENTION

HS-Drone (name of this invention embodiment) is a transition VTOL wherein a number of forces on a tiltwing cause the tiltwing to transition from vertical thrust to a thrust having a greater forward component. Examples of torques acting on a tiltwing include torques from the center of gravity (CG), from aerodynamic forces, and from a thruster motor (hereafter, "thruster") that has a thrust vector that does not go through the tiltwing's axis of rotation.

The pitch and respective thrust vector of the tiltwings of the embodiments of this invention are Passively-adjusting such that increasing velocity leads to more-horizontal thrust vectors (up to points of diminishing returns). The pitch of the fuselage is actively controlled by a number of methods, the most common of which is the rotational speed of the thruster (or thrusters) on the fuselage relative to the rotational speed of the thruster (or thrustmotors) on the tiltwing. In this document and associated claims, thrusters are primary propulsion means as compared to much literature where thrusters are secondary propulsion means.

A feature that distinguishes the embodiments of this invention from most transitioning VTOL vehicles is that only about 10% to 50% of the VTOL thrust is transitioned toward horizontal thrust therein allowing fuselage thrusters to be optimized for VTOL operation and tiltwing thrusters to be optimized for cruising.

BRIEF DESCRIPTION OF THE DRAWINGS

FIG. 20 is a tricopter with thrusters angled forward from vertical and a rudder with axis of rotation at a pitch so the rudder can directed prop slipstream with a rearward vector component.

FIG. 21 is a table identifying actuators controlled to achieve control of pitch, roll, yaw, and velocity/altitude. The term "[I]" indicate independent as in a controlled parameter as opposed to being parameter dependently set by other factors.

DESCRIPTION OF INVENTION

Figure 1:
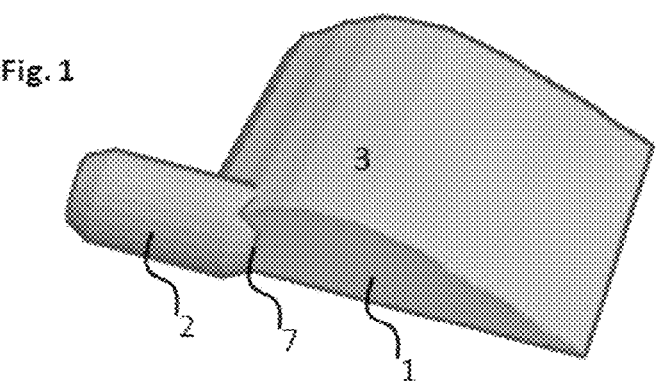
FIG. 1 is an illustration of a wing with thruster forming a passively-adjusting tiltwing.
Figure 2:
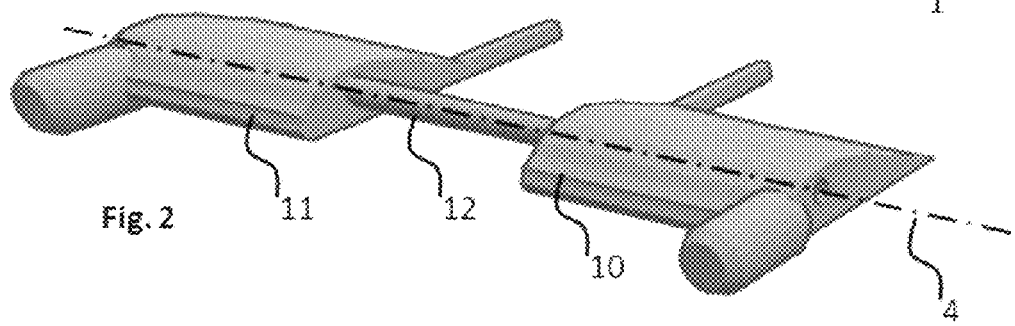
FIG. 2 is an illustration of a left passively-adjusting tiltwing and right passively-adjusting tiltwing joined with a shaft with illustration of a lateral axis of rotation.
Figure 3:
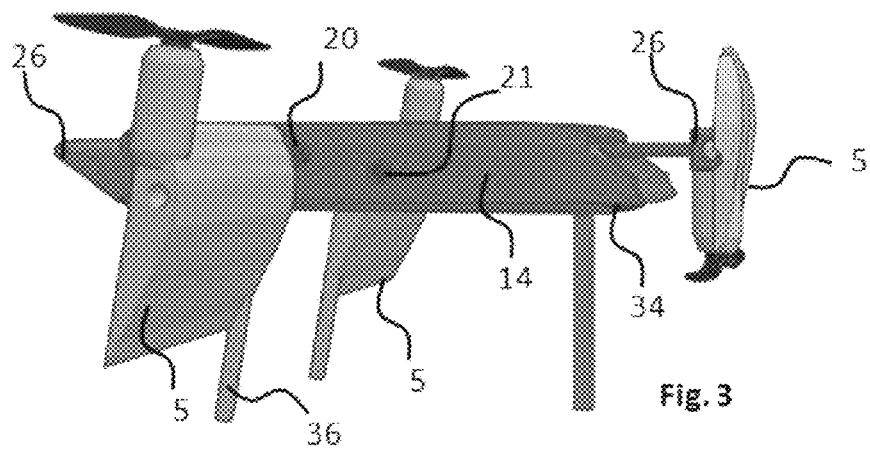
FIG. 3 is an illustration of an aerial vehicle with three thrusters, including a tail thruster in a vertical thrust configuration.
Figure 4:
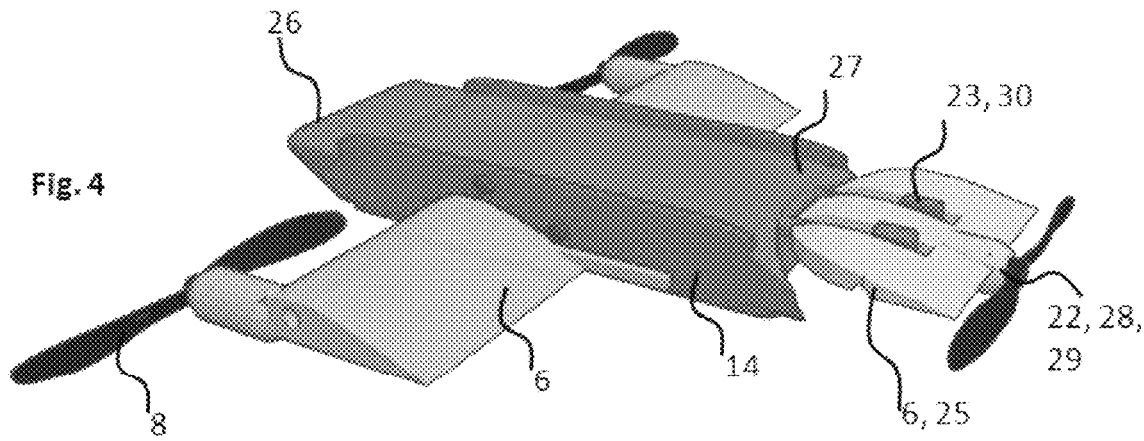
FIG. 4 is an illustration of an aerial vehicle with three thrusters, including a tail thruster, in a horizontal thrust configuration.

The invention includes an aerial vehicle comprising: a wing 1, a thruster 2 statically connected to the wing 1 forming a passively-adjusting tiltwing 3 (see FIG. 1 and FIG. 2), a lateral axis 4 passing through the wing 1 having a thrust orientation freely rotatable from a vertical thrust configuration 5 (see FIG. 3) to a horizontal thrust configuration 6 (see FIG. 4). Vertical is wing 1 leading edge up (see FIG. 3). The lateral axis 4 is an imaginary line used for invention specification. Impacting air from horizontal flight impacts the wing and produces a torque around the lateral axis 4, and the thrust orientation is passively set by a balance of torques generated around the lateral axis 4. The preferred aerial vehicle is a multicopter.

The movement of the passively-adjusting tiltwing 3 is inherently dampened by the inertia from the mass of the passively-adjusting tiltwing 3. Tiltwing dampening may be supplemented.

Figure 5:
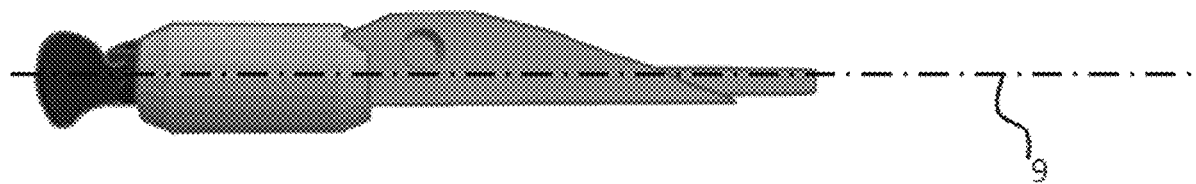
FIG. 5 is a side view of a passively-adjusting tiltwing illustrating a thruster's axis of rotation.

The thruster 2 has a motor axis center of rotation 9 where in the horizontal thrust configuration 6 said motor axis 9 is an imaginary line extending longitudinally forward and preferably located at or below the lateral axis 4 (see FIG. 5). Said passively-adjusting tiltwing has a center of gravity ("cg") where in the vertical thrust configuration 5 said cg is at or below the lateral axis 4. In the horizontal thrust position, the tiltwing's cg generates a positive torque around the lateral axis 4 (herein, implicitly defining positive torque direction); impacting air from horizontal flight produces a negative torque around the lateral axis 4. Here, positive torque is a force toward increasing the pitch angle of the tiltwing.

When the thruster axis does not intersect the lateral axis, the thrust of the motor produces a torque around the lateral axis 4. This is an additional degree of freedom in the passive movement and positioning of the passively-adjusting tiltwing. The tiltwing cg producing a positive torque dictates the tiltwing cg is located aft (toward tail) the tiltwing pivot axis 4.

Optionally and as possible, a thruster axis passes, or effective axes of thruster pairs pass, through the vehicle's cg.

Examples of thrusters include a propeller attached to an electric motor and a jet engine. Horizontal thrust (and horizontal configuration) generates force to propel the aerial vehicle in the longitudinal (horizontal direction of travel) direction. Vertical thrust is thrust to propel the vehicle upward. Preferably, thrust from the tiltwing during vertical takeoff is less than half the total vertical takeoff thrust and lift force from the tiltwing is less than half the total multicopter weight.

A preferred aerial vehicle is comprised of a left passively-adjusting tiltwing 10 and a right passively-adjusting tiltwing 11 connected by a shaft 12 passing through a bearing said bearing 13 connected to a fuselage 14.

Figure 6:
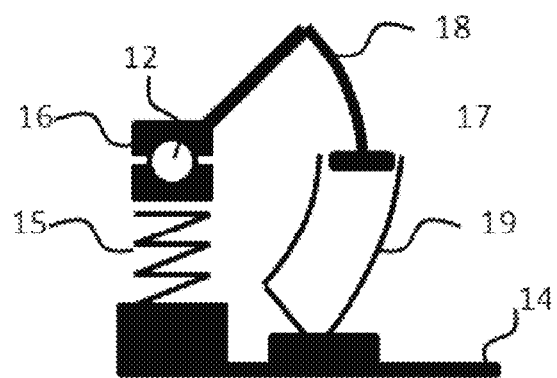
FIG. 6 is a side view cross section showing a lateral shaft with damper and magnetic lock.

A preferred aerial vehicle is comprised of an electromagnetic 15 connected to the fuselage 14 and magnetic material 16 contacting the shaft 12 where activation of the electromagnet 15 creates a force on the shaft 12 wherein said force locks the shaft against rotation (see FIG. 6).

A preferred aerial vehicle is comprised of a damper 17 with a moving damper component 18 connected to the shaft 12 and a stationary damper component 19 connected to the fuselage 14. The damper of this embodiment dampens movement within a predetermined angle range of rotation.

More preferably, the aerial vehicle is a multicopter comprising: a fuselage, a fuselage thruster, a wing 1, and a tiltwing thruster 2 statically connected to the wing 1 forming a passively-actuated tiltwing 3, wherein a bearing mechanically couples the tiltwing and the fuselage said tiltwing freely rotatable relative to the fuselage within a predetermined angular range, wherein impacting air produces a torque force on the tiltwing said tiltwing passively positioning at an angle within the angular range balancing torques within the bearing, and wherein thrust of the fuselage thruster relative to thrust of the tiltwing thruster controls the pitch of the fuselage. Preferably, the tiltwing is near the front of the fuselage and thrusters directly connected to the fuselage are near the rear of the fuselage. Preferably the first and a second fuselage thrusters are set at an angle between 50 and 85 degrees relative to the median angle of the fuselage's lower surface.

Illustrative Examples 4 and 5 identify the following preferred design features: a) a cg below the tiltwing axis 4 provides a robust and reliable method to position the tiltwing for vertical thrust for takeoff and landing wherein at tiltwing angles from 0 to 90 degrees the cg produces a positive torque force by the convention that the cg biases toward increased pitch, b) the negative torque force resulting from the vehicles forward velocity relative to air is the force enabling passive adjusting and critical to performance, and c) an additional positive torque force is needed to bias in the desired vertical position during takeoff and landing. A variety of devices are available to provided this biased force; a partial list includes: a) torque resultant of force of the tiltwing thruster said motor have an axis of rotation below the bearing axis, b) torque resultant of a spring having a first end connected to the fuselage and a second end connected to the tiltwing, c) torque resultant of a variable force electromagnetic damper with a first end connected to the fuselage and a second end connected to the tiltwing, and d) torque resultant of tiltwing thruster prop slipstream impacting a back-side concave surface of the wing 1.

The tiltwing centroid ratio (distance from lateral axis 4 to the center of gravity divided by distance from lateral axis 4 to aerodynamic force centroid) is a critical design parameter for tiltwings with preferred values between 0.2 to 5 with the latter for higher velocity aircraft. For all tiltrotor centroid ratios, the center of gravity was sufficiently below the lateral axis 4 so as to provide a strong pendular stability; this translates to Lc (distance from the lateral axis 4 to the tiltwing center of gravity) being greater than 10% of the longest chord of the wing 1, more preferably greater than 20% of the longest chord of the wing 1, and most preferably between 30% and 50% of the longest cord of the wing 1.

Herein, multicopter is an aerial vehicle with two or more thrusters such as electric-motor-driven propellers. More preferably, a multicopter is a tricopter or quadcopter. The tiltwing preferably rotates in a spanwise axis which is a lateral axis, and rotation of tiltwing around the axis is typically block from rotating more than 120 degree ranges, from 0 to 120 degrees (horizontal is zero, positive degrees are vertically upward from zero).

A preferred aerial vehicle includes two stops 20 and 21 on the fuselage that physically restrict shaft 12 rotation to a range up to about 120 degrees. Movement of the tiltwing's leading edge rearward from vertical creates a stable position for leg extensions of the passively-adjusting tiltwing to support the weight of a parked vehicle. However, passive control is easier when the tiltwing (thrust vector) angle rotates from about 70 degrees to 0 degrees wherein the axis of rotation of the thruster coincides approximately with the cord of the wing 1.

Optionally, two tiltwings with axis of rotation having a substantial, but not totally, spanwise vector with mechanical connecting to the fuselage through two bearings in a manner symmetric to a vertical plane passing through a longitudinal center axis of the fuselage.

Preferred options on the preferred embodiment include a) the bearing coupling a shaft in a spanwise axis wherein the shaft is connect to the tiltwing, b) the shaft passing through the fuselage and connecting to the tiltwing on both sides of the fuselage where the fuselage is broadly identified as the vehicle body and any arm extensions from the fuselage, c) use of two tiltwing thrusters said two tiltwing thrusters being electric motors turning propellers, and d) use of two fuselage thrusters said two fuselage thrusters being electric motors turning propellers.

A preferred aerial vehicle is comprised of a third thruster 22 with mechanically adjustable orientation 23 from horizontal thrust orientation through vertical thrust orientation. Preferred operation is for this third thruster 22 to be adjusted by the pilot (person or autonomous) after vertical takeoff to provide for forward movement. That forward movement impacts the orientation of freely rotating passively-adjusting tiltwings that passively adjust from vertical toward more-horizontal flight. Vertical flight includes stationary flight (fixed altitude).

Figure 7:
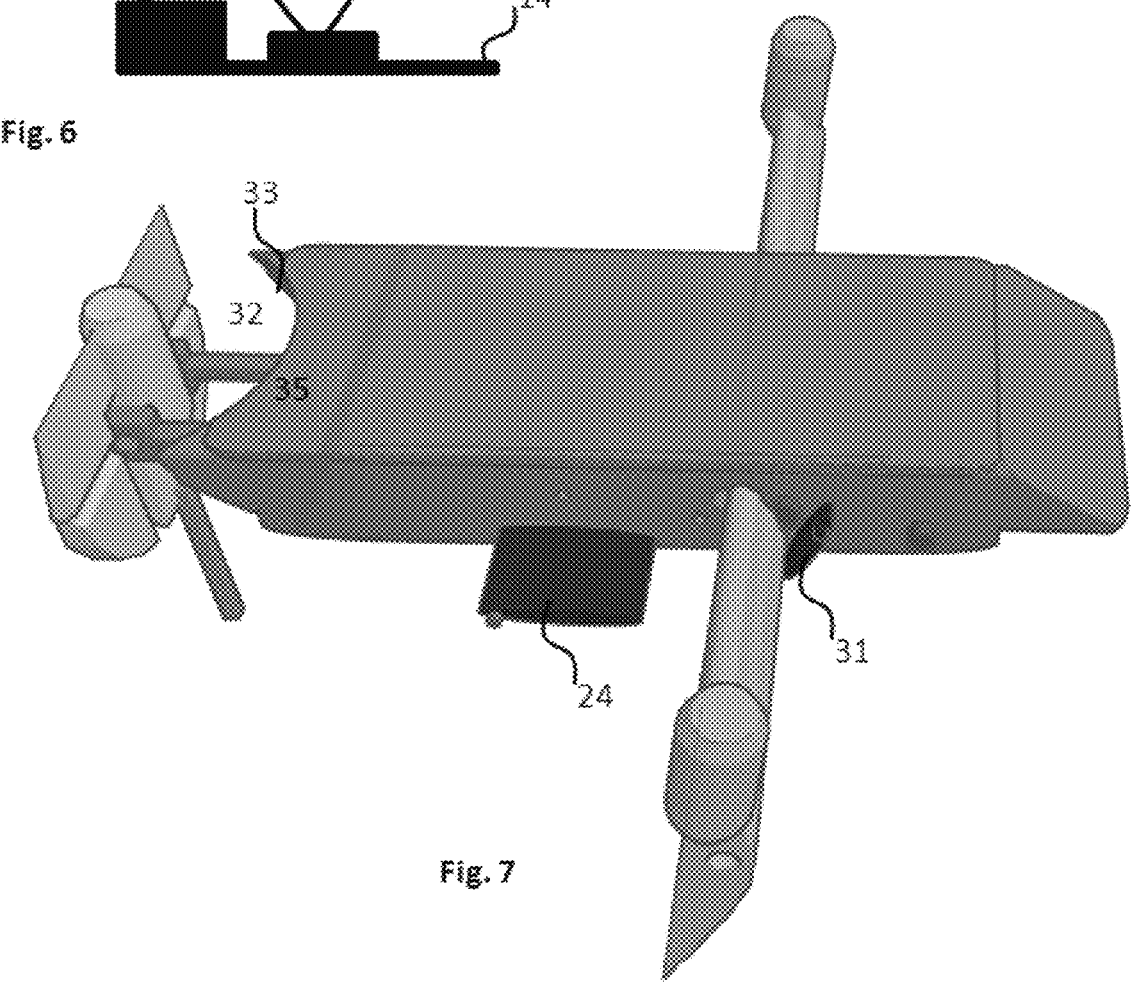
FIG. 7 is an illustration of an aerial vehicle with three thrusters, including a front thruster, in a vertical thrust configuration illustrating a flap and control arm.
Figure 8:
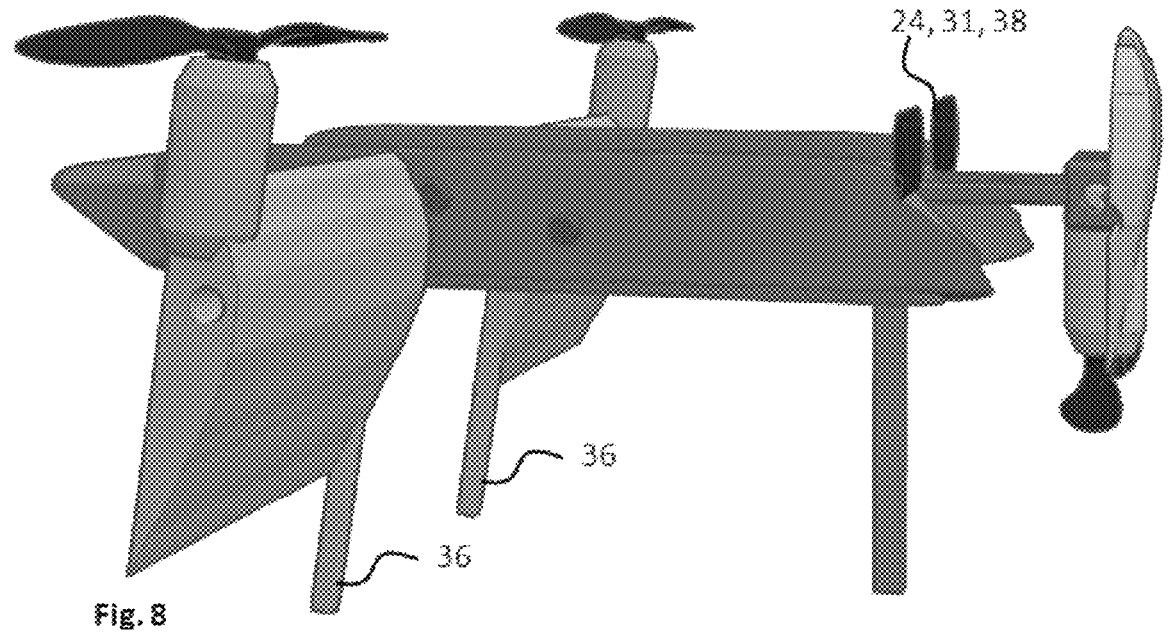
FIG. 8 is an illustration of is an illustration of an aerial vehicle with three thrusters, including a tail thruster in a vertical thrust configuration illustrating a tail flap.

A preferred aerial vehicle includes a flap 24 located in front of the wing 1 and connected to a fuselage 14 wherein different flap 24 orientations deflect air differently on the wing 1 producing different torques around the lateral axis 4. Different torques result in different orientations of the passively-adjusting tiltwings. FIG. 7 illustrates a flap 24 adjacent to a side passively-adjusting tiltwing. FIG. 8 illustrates a flap 24 adjacent to a tail thrust spoiler. In this embodiment, flap is indicated in a broad sense and includes flaps, rudders, and basically any adjustable air-deflecting device; deflecting of air.

Optionally, the vehicle includes a wing that is a spoiler 25 connected to an end of a fuselage 26 referred to as a thrust-spoiler. The thrust-spoiler may be in the front, tail, or both front and tail of a vehicle. Preferably, the spoiler 25 section of the thrust spoiler is continuous extension of fuselage lifting-body surfaces 27 when in the horizontal position.

The preferred aerial vehicle includes a left passively-adjusting tiltwing 10, a right passively-adjusting tiltwing 11, and an end thruster 28. The preferred aerial vehicle includes a passively stable configuration comprising: an adjustable first thruster 29 with orientation that is specified by a vehicle control system, a second thruster having an inherently stable orientation for each orientation of the adjustable thruster 29. More preferably, the vehicle includes a passively stable configuration comprising: a mechanical support joint 30 having an adjustable angle attached to adjustable thruster 29. Optionally, the aerial vehicle includes a passively stable configuration comprising: a mechanical arm 31 attached to the fuselage that contacts a adjustable passively-adjusting tiltwing comprising the adjustable thruster 29.

While previously indicated as at the rear, the mechanical arm 31 may contact and adjust a wing (FIG. 7) or a spoiler (FIG. 8). The objective is to keep actuators (e.g. electro-magnets, motors, hydraulics, electronics) on and in the fuselage as opposed to a passively-adjusting tiltwing. FIG. 8 illustrates a rear flap 24 that is a mechanical arm 31 as well as a rear flap to adjust the angle of attack of air on the fuselage.

Optionally and when preparing for landing, the aerial vehicle includes a control algorithm comprising the sequence of reducing speed of a (back) motor, maintaining desired flight pitch by setting a flap orientation, and allowing orientation of one or more thrusters to progress toward a more-upward orientation.

Figure 9:
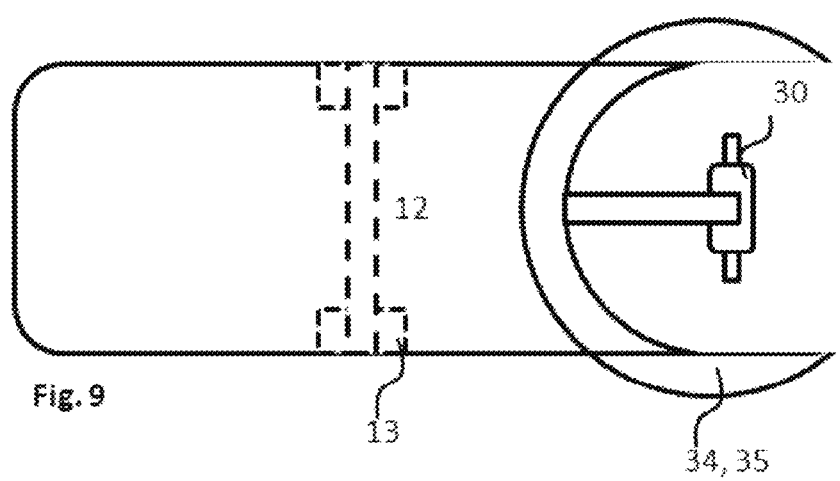
FIG. 9 is horizontal cross section of a fuselage illustrating lateral shaft bearings.

The preferred aerial vehicle includes a horizontal partial cylindrical path 32 in the fuselage with cylindrical perimeter 33 in proximity of outer-most rotational path of thruster blades with axis of rotation in vertical position wherein horizontal surfaces of the fuselage extend from the perimeter 33 away from the axis of rotation. This is illustrated by FIGS. 7 and 9.

The preferred aerial vehicle includes a lifting body fuselage comprising: a cabin, said cabin having an average cabin length, a cabin average width, and a cabin average height; a lift path, said lift path having a width greater than six tenths the cabin average width and said lift path having a length greater than seven tenths the cabin average length; said lift path having a front third with a front average pitch, a back third with a back average pitch, and a middle third with a middle average pitch; wherein the back average pitch is 1 to 3 degrees less than the front average pitch.

The preferred aerial vehicle includes legs 36 (see FIG. 8) as extensions of wings. A combination of angle and a stop, and/or a electromagnet lock 15 can be used to set the let in a solid position to support vehicle weight.

The preferred aerial vehicle includes a wing with ratio of cord to thickness greater than 10 and a wing aspect ratio (span/cord) less than 2.0. Larger wing spans are not needed when using lifting-body fuselage designs. A preferred embodiment is a lifting body aerial vehicle comprising a passively-adjusting tiltwing, a fuselage, and fuselage outer surface area wherein at least half of the fuselage outer surface area has a pitch and slant within 2 degrees.

Improved Thruster Design

An improved electric motor is comprised of multiple stator discs 39, multiple rotor discs 39, and a common shaft

Figure 12:
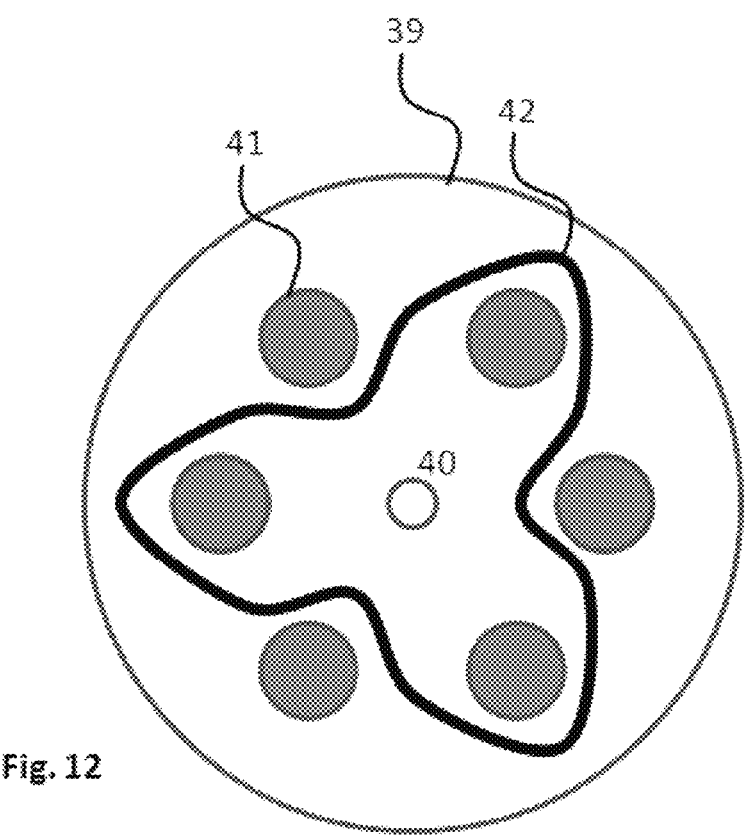
FIG. 12 is an illustrative of a disc-shape stator (or rotor) of a motor where a single loop of secondary coil contacts the perimeters of multiple magnetic cores with applications for ultra-light thrusters for aircraft.

40; wherein the discs are spaced along the shaft with stator discs on each end in an alternating sequence of rotor and stator discs, wherein the discs are comprised of angularly spaced magnetic cores 41 at set distance from the shaft, wherein a conductive wire loop 42 said loop having a path adjacent to perimeters of the cores (see FIG. 12) alternating from contact with inner and outer sections of the core perimeters where inner and outer is with respect to the radius of the disc, and wherein said loop is the secondary partial coil of a primary induction coil said induction coil induces an alternating current in the loop.

A preferred electric motor is comprised of a wire of the loop 42 where the wire is a tube through which a cooling fluid is circulated wherein the cooling fluid is routed to and from a heat exchange surface and heat is removed from the cooling fluid. A preferred rotor moves air in the spaces between the rotor and stator discs to advance cooling where the loops is near the surfaces to facilitate cooling.

Preferably, a single cooled primary coil produced a filed traveling through an aligned set of cores of the stator discs wherein the aligned discs are cores of the secondary partial coils said secondary partial coils being part of the said loop. Herein, one cooled primary coil energizes the loop for multiple magnetic cores on multiple stator discs to provide a high torque motor.

Tricopter and Quadcopter

Figure 13:
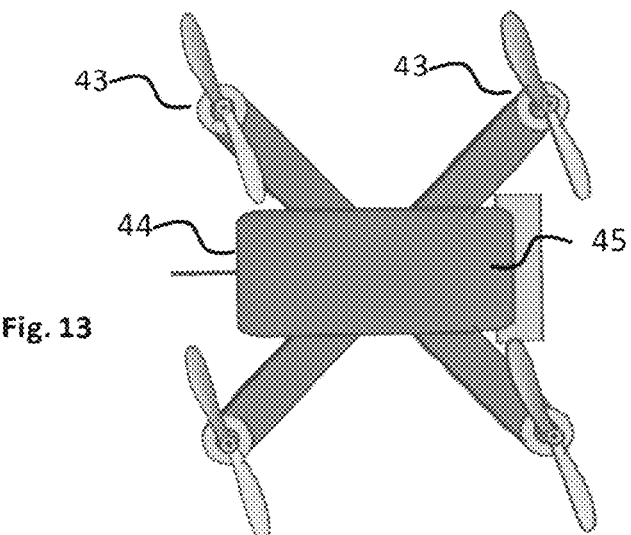
FIG. 13 is a top view an illustration of is a flying aerial quadcopter vehicle corresponding to side view of the same vehicle in FIG. 15.
Figure 14:
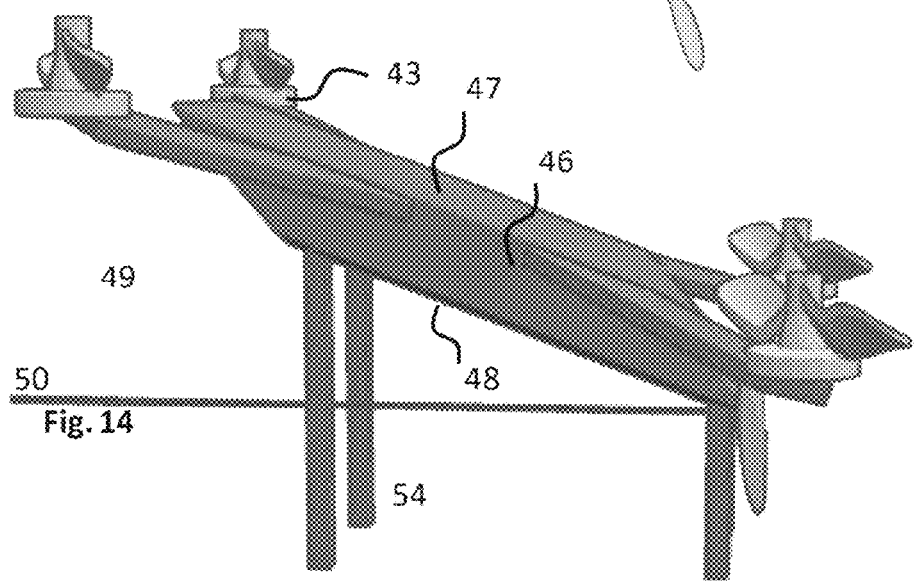
FIG. 14 is a side view an illustration of the aerial quadcopter vehicle of FIG. 13 in a landed position.

A preferred drone application is a lifting body aerial vehicle of FIG. 13 comprising a) a plurality of thrusters 43, b) a vehicle front 44 and a vehicle tail 45, c) a fuselage 46 said fuselage having a total wetted surface area, an upper surface 47, and a lower surface 48, d) a fuselage landed orientation 49 (see FIG. 14) with a longitudinal centerline 50 landed-position axis said axis being an imaginary line, d) a fuselage cruising orientation 51 (see FIG. 15) said cruising orientation having a longitudinal centerline cruising-position axis 52 said axis being an imaginary line, e) an exterior surface tangent line said line tangent to the surface said line being an imaginary line said tangent line having a pitch angle relative to the landed position, a pitch angle relative to the cruising position, and a slant angle, and f) an overall thrust angle said angle being the angle of the cumulative thrust of all thrusters relative to vertical with positive in toward the front of the vehicle.

Preferably, in the cruising position at least half the surface area's slant angles are between −4 and 4 degrees and at least half the pitch angles are between 0 and 4 degrees. Also, in the cruising position the overall thrust angle is more preferably between 0 and 30 degrees. Also, in the landed position the overall thrust angle being near 90 degrees.

An optional rear flap 53 may be used to augment lift and to change the average pitch of the lower surface. Legs 54 are at lengths as appropriate to provide a net upward thrust when in the landed position. The lifting body has a rounded front (edge or nose) to provide favorable aerodynamic features.

In general, liftpath features are incorporated on the lifting body of the preferred drone.

Most-Preferred Quadcopter

A most-preferred quadcopter embodiment comprises: a fuselage, a front tiltwing said front tiltwing having two thrusters, a pair of rear thrusters, and a total aerodynamic lift surface area including the tiltwing and quadcopter fuselage but not including propeller blades; wherein, the lift provided by the tiltwing is less than half the lift provided by the total aerodynamic surface area. Quadcopters of FIGS. 17 and 18 meet these most-preferred criteria.

Figure 18:
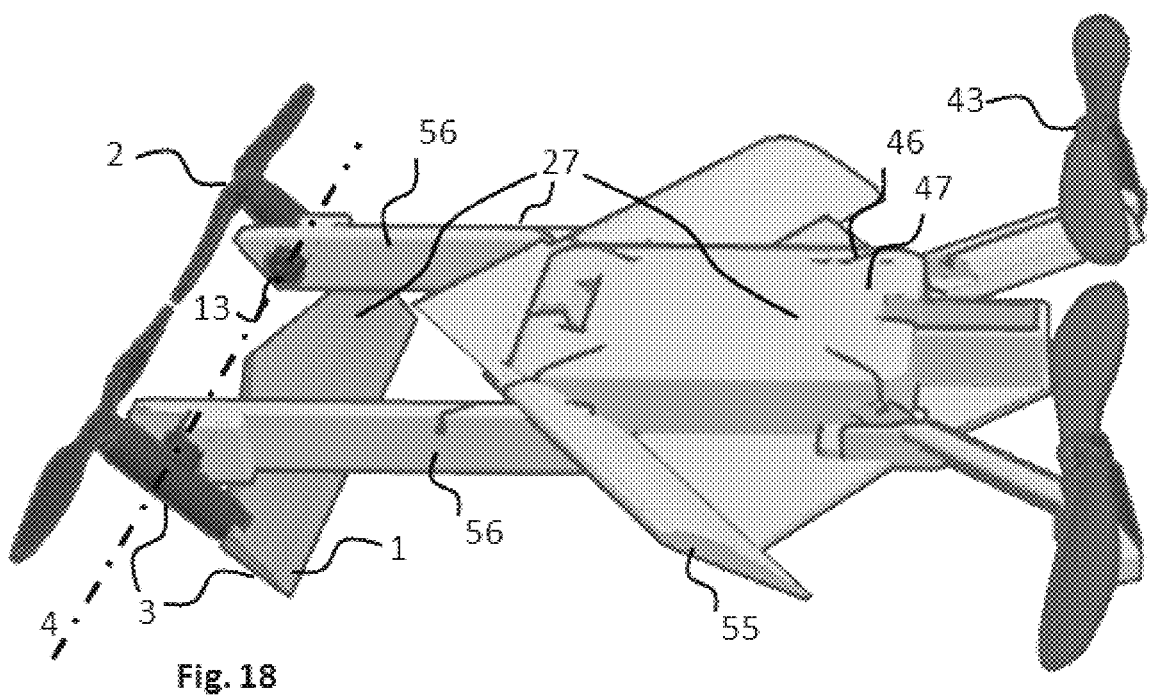
FIG. 18 is a quadcopter with a passively-adjusting tiltwing where the tiltwing is comprised of a single wing spanning under a mechanical coupling bearing that couples the tiltwing to the fuselage.
Figure 19:
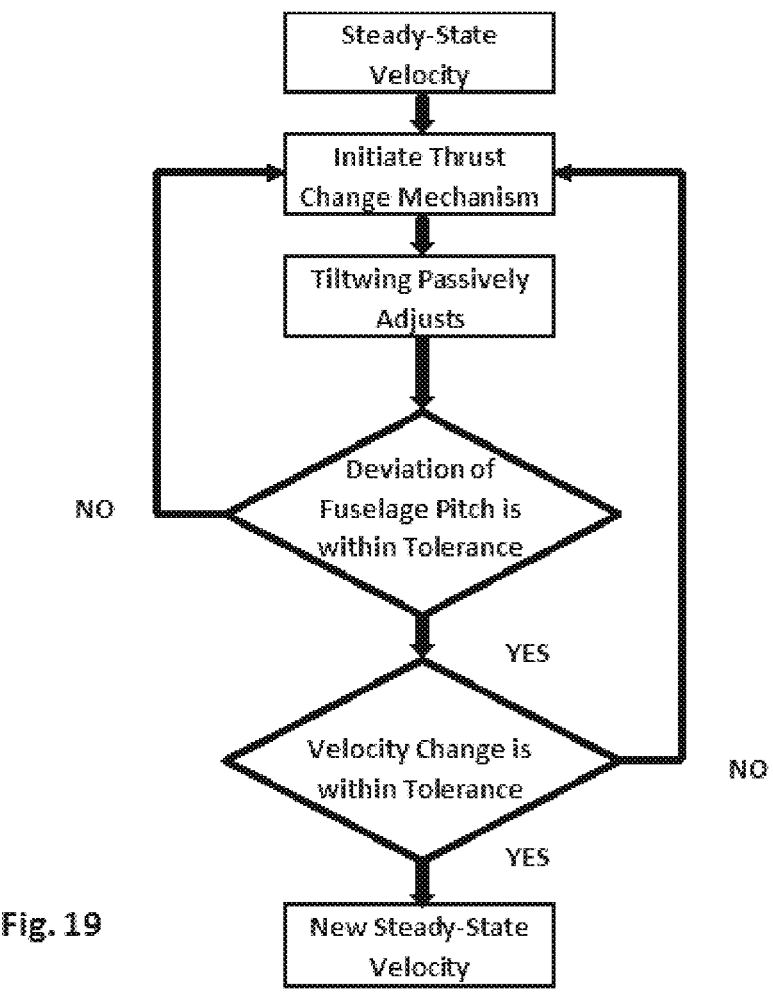
FIG. 19 is an algorithm for changing steady-state velocity.

The most-preferred quadcopter has a passively-adjusting front tiltwing and a fixed wing extending laterally from the sides of the fuselage 55 such as the quadcopter of FIG. 18. At some scales, like small toys, the only controlled electronics are the speeds of the four electric motors of thrusters which are electric-powered propellers.

Arms 56 projecting from the fuselage to the tiltwing bearings 13 are considered part of the fuselage in defining embodiments of these inventions. By example and functionally, relatively narrow arms minimize prop slipstream from hitting the larger surfaces of the fuselage.

Figure 17:
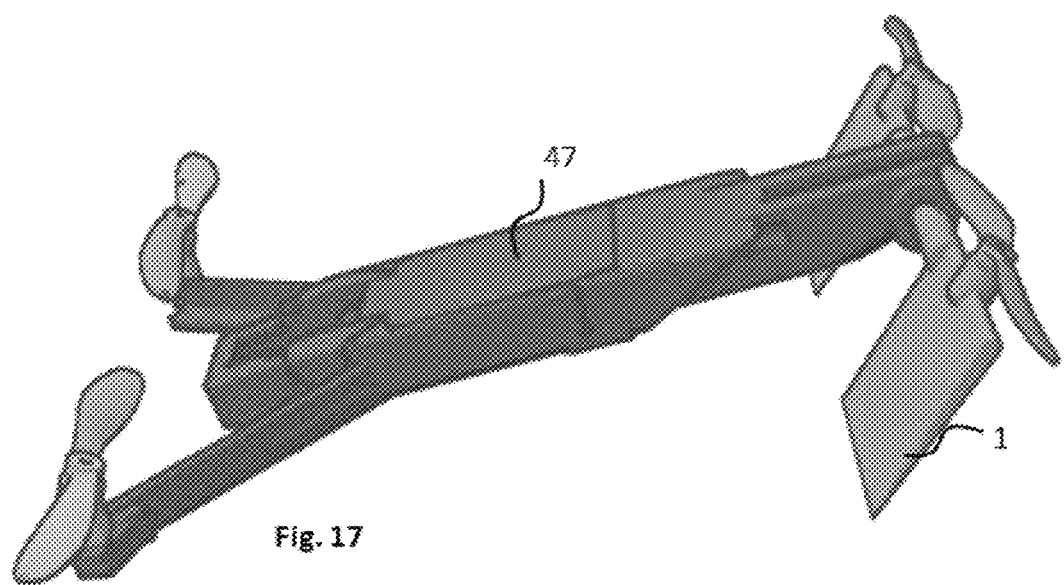
FIG. 17 is a side view of a quadcopter with a passively-adjusting tiltwing on the front with two thrusters and two rear thrusters set at about 60 degrees (a 30 degree tilt forward from vertical).

FIGS. 17 and 18 show the most-preferred quadcopter configurations with a pair of rear thrusters fixed in a tiltrotor position at an angle of 45 to 85 degrees relative to the fuselage (where fuselage is at 0 degrees pitch); more-preferably between 70 and 90 degrees.

Figure 16:
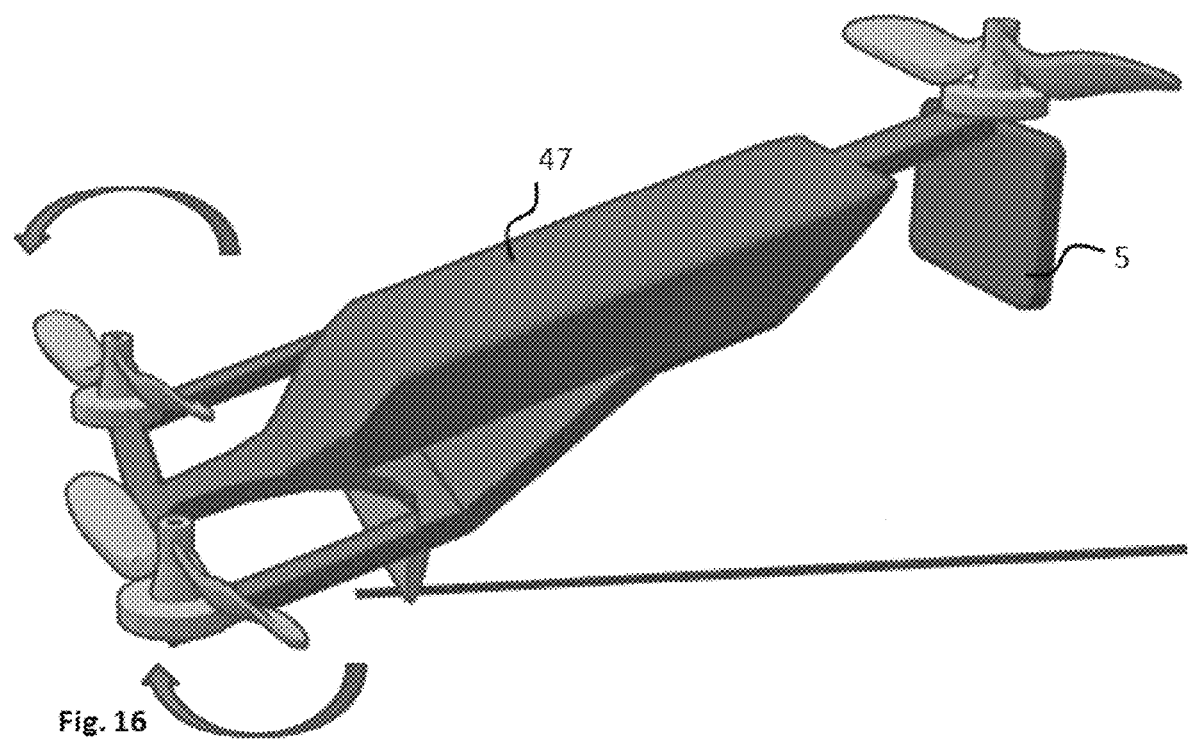
FIG. 16 is a side view of tricopter with fixed back thrusters and a front passively-adjusting tiltwing which orients toward horizontal flight (bearing not shown). Back thrusters can turn off in horizontal flight with props aligned longitudinally and aerodynamic in profile.

The vehicle comprising a passively-adjusting tiltwing may be a tricopter comprising a pair of fixed tilt thrusters located on opposite sides of the fuselage. Preferably, the pair of thrusters are propeller thrusters of opposite rotation. FIG. 16 illustrates the preferred rotation of a pair of propeller thrusters so that angular vectors of the propellers facilitate forward thrust.

Preferably, the tricopter is comprised of a fuselage and a fixed wing extending laterally from the sides of the fuselage. The tricopter has a total aerodynamic lift surface area including the tiltwing, any fixed wing, and a lifting body fuselage but not including propeller blades; wherein, the lift provided by the tiltwing is less than half the lift provided by the total aerodynamic surface area.

More-preferably, tiltwings on all multicopters of the embodiments of this invention have lift surface areas less than one third the total lift aerodynamic lift surface areas of the multicopters.

Optionally, the multicopter is connected to freewings (tiltwings without thrusters); said freewings may act as shudders that smooth air flow past propellers that are not needed for cruising.

Optionally, the tricopter has a rear prop that is larger than two symmetric side props and wherein the two side props have the same rotation and the rear prop has an opposite rotation that of the side props. Alternatively, the aerial vehicle is tricopter and wherein a front prop is larger than two symmetric side props and wherein the two side props have the same rotation and the front prop has an opposite rotation that of the side props.

Tricopter embodiments of this invention are not limited to transitioning tricopters. In the more general sense, the tricopter embodiment comprises a fuselage, a fuselage bottom surface 48, a median longitudinal tangent angle of the fuselage bottom surface, a front thruster 60, two rear thrusters said two rear thrusters 59 statically connected to the fuselage at an angle between 50 and 85 degrees relative to the median longitudinal tangent angle of the fuselage bottom surface, and a rudder said rudder 58 located in the slipstream of the two rear thrusters. A performance advantage of this embodiment is that tricopter yaw, roll, pitch, and velocity can be controlled by actuator settings said settings being three motor speeds and a rudder angle. Herein, the term "thrusters" is short for thrusters. Alternative to the thrusters being mounted at an angle, the rudder axis of pivot may be mounted at an angle, preferably form 30 to 85 degrees. Alternatively, the tricopter comprises a fuselage, a fuselage bottom surface, a median longitudinal tangent angle of the fuselage bottom surface 48, a front thruster 60, two rear thrusters said two rear thrusters 59 producing a slipstream, rear motor axes of rotation for the two rear thrusters said rear motor axes of rotation having a pitch, and a rudder 58 said rudder having an axis of rotation said rudder axis of rotation having a pitch said rudder located in the slipstream of the two rear thrusters, wherein the rudder axis of rotation pitch is more than five degree different than the rear motor axes of rotation pitches.

As an alternative to statically connecting thrusters to a fuselage, the thruster may be connected to an arm's first end with the arm's second end connected to an extension of the fuselage by a hinge joint of limited vertical movement. For this embodiment, when the thruster is not operating, the thruster is in a lower position said lower position optionally being more aerodynamically streamlined with the fuselage with an example thrust vector pitch of about 90 degrees relative to the fuselage. When the thruster is operating at high upward thrust, the thruster hinges to a lower pitch with an example thrust vector pitch of about 70 degrees. Herein, the motor is not "statically connected" to the fuselage; rather, it is "set" at an angle (or pitch) relative to the fuselage.

Lifting Body Options

The most preferred lifting body fuselages have lift paths on both upper and lower fuselage surfaces. Lift is generated by higher pressure on lower surface 48 and lower pressure on upper surface 47.

The most-preferred embodiment of this invention is an aircraft with an upper lift path surface (hereafter upper LiftPath) and a lower lift path surface (hereafter lower LiftPath) on the upper and lower surfaces of the fuselage, respectively. The LiftPaths are generally rectangular in shape having a width similar to the fuselage width and a length along most of the fuselage. During flight the LiftPaths bend air downward to create a lift force and transfer that force to the aircraft on surfaces of relatively low pitch so as to preserve a high ratio of lift to drag forces. Preferred applications include but are not limited to fixed wing aircraft and tethered lifting-body gliders.

Surface slant (also referred to as slant angle) is illustrated by U.S. patent application Ser. No. 16/240,715; wherein, following notation of that application, slant is an angle formed in the vertical-lateral plane between a line tangent to a surface and a horizontal plane with the vertex at the aircrafts plane of symmetry. Surface slant is defined for a surface with the aircraft at zero roll and zero angle of attack. In a forward facing position, positive slant angle changes are counterclockwise for upper surfaces on starboard side and lower surfaces on port side and clockwise for upper surfaces port side and lower surfaces starboard side.

The Liftpath width is defined in terms of a generally flat, concave, or piecewise flat surface said width having a horizontal lateral dimension of length between points on LiftPath edges said edges generally specified wither the surface slant progresses from more than −8 degrees to less than −8 degrees.

In the more-preferred embodiment, the aircraft has: a cg, an exterior surface, an aircraft front, an aircraft tail, a maximum width, surface pitch angles relative to a reference plane, and surface slant angles 1. The preferred aircraft uses liftpath surfaces on both the top and bottom of the fuselage.

The more-preferred aircraft comprises (a) a fuselage; (b) a plurality of high-lift-to-drag (L:D) capturing surfaces having: surface areas, pitch angles between 0 and 2 degrees, an average pitch angle, and slant angles between −4 and 4 degrees; (c) a plurality of lift-stabilizing surfaces located behind the cg having: surface areas, pitch angles between −2 and 1 degrees, slant angles between −4 and 4 degrees, and an average pitch angle less than the average pitch angle of the L:D capturing surfaces; (d) at least one lift path surface (LiftPath) extending longitudinally on the fuselage having: a median width, a median length, a surface area, a fore end, an aft end, a port edge, and a starboard edge; and (e) a payload compartment in the fuselage having a median maximum width and a median length.

Further more-preferred aspects are the aircraft wherein: (i) the lift path surface is within the aircraft's exterior surface with a transition from the edges and ends of the lift path surface wherein the transition at the port and starboard edges has slants greater than −2 degrees, the transition at the aft end has pitches greater than −2 degrees, and the transition at the fore end has pitches less than 4 degrees, (ii) the lift path surface's median width is greater than one ninth the aircraft's maximum width, (iii) the lift path surface's median width is between than eight tenths and twelve tenths the payload compartment's median maximum width, (iv) the lift path surface's median length is greater than seven tenths the payload compartment's median length, (v) greater than one fourth of the total lift path's surface area is comprised of lift-stabilizing surface areas, (vi) greater than two thirds of the total lift path surface areas are comprised of high-L:D-capturing surface areas, and (vii) the pitch reference plane is the plane of tangency on the lift path at the lift path's closest point to the aircraft's cg.

Preferably the lift-stabilizing surface area behind the cg is between 53% and 70% of the total high-lift-to-drag-capturing surface area.

Optionally, there are fences on both sides of the lift path surface wherein the fence has a vertical extension between 2% and 20% of the lift path's median width and an outward horizontal extension between 0% and 20% of the lift path's median width. Preferably the lift path's surface connects smoothly and continuously with a wing's surface and the fence's vertical extension goes to zero at a location by the wing's surface.

Optionally, there is a platform on each side of the fuselage, each said platform having a vertical thickness between 1% and 20% of the lift path's median width, a width between 1% and 70% of the lift path's median width, a length between 30% and 100% of the lift path's median length; wherein, the lift path's surface connects smoothly and continuously with a platform surface and the fence's vertical extension goes to zero at a location by the platform's surface.

Optionally, there is a cabin walk-path vertical extension of the lift path surface said extension expanding a portion of the lift path surface away from the payload compartment wherein said expansion has a width between one and four feet.

Optionally, there is an upper lift path surface wherein said upper lift path surface is a lift path surface on the top of the fuselage. Optionally, there is a pressure-reducing canopy having a continuous and smooth surface connection to the fore end of the upper lift path surface wherein: said pressure reducing canopy having a median slant between −4 and 4 degrees, a forward pitch of less than −10 degrees, a continuous mid-section pitch reaching a peak height at a zero degree pitch, a starboard side, a port side, a width extending from the lift path port side to the lift path starboard side, and a smooth surface connection to upper lift path surface. Optionally, there are fences on both sides of the pressure reducing canopy wherein the fences have equal vertical extensions between 2% and 20% of the lift path's median width and an outward horizontal extension between 0% and 20% of the lift path's median width Optionally, there is an upper rear wing said upper rear wing having an upper surface and a lower surface wherein the lift path's surface connects smoothly and continuously with the upper rear wing's upper surface.

Optionally, there is a lower lift path surface wherein said lower lift path surface is a lift path surface on the bottom of the fuselage. Optionally, there is a pressure-generating surface having a continuous and smooth surface connection to the lower lift path surface wherein: said pressure generating surface having a median pitch between 20 and 50 degrees on the front of the fuselage, a median slant between −4 and 4 degrees, and a continuous decrease in surface pitch until the smooth and continuous connection with the lower lift path surface. Optionally, there are fences on both sides of the pressure-generating surface wherein the fences have equal vertical extensions between 2% and 20% of the lift path's median width and an outward horizontal extension between 0% and 20% of the lift path's median width. Optionally, there is an upper rear wing said lower rear wing having an upper surface and a lower surface wherein the lift path's surface connects smoothly and continuously with the lower rear wing's lower surface.

Optionally, there is an upper rear wing, a lower rear wing, and fuselage sides, wherein the distance between the fuselage sides decreases to a vertical edge between the upper rear wing and the lower rear wing.

Optionally, there is one or more rear wings where the rear wing is a swept wing.

Optionally, there is a wing, an energy storage means, and a propulsion means wherein the wing has a wingspan greater than three times the median maximum payload compartment width.

Optionally, there is a tether wherein the aircraft is a tethered glider and the tether pulls the aircraft along a guideway.

Optionally the aircraft is in supersonic flights and wherein a Liftpath is on the upper surface of the fuselage.

Optionally, there is a rudder at the feed or discharge of a rear propeller wherein the rudder in a state of hovering flight.

Alternatively, the lift path surface embodiment is an embodiment of lift path surface sections, where: (d) a plurality of lift path surface sections extending longitudinally on the fuselage having: a median width, a median length, a cumulative surface area of all lift path sections, fore ends, aft ends, port edges, starboard edges, and a lift path section of closest approach the aircraft's cg. Here the limits on "surface's" of the preferred embodiment apply to the "surface sections "s".

Control Strategy

A performance advantage of HS-drone is high-L:D-capturing surfaces; of which, the fuselage surface is particularly important for VTOL. A set point of control algorithms is maintaining nose-up orientations (positive) that are preferably 0 to 10 degree fuselage pitches; wherein, 0 pitch (i.e. horizontal) is when the median angle of the fuselage's lower surface 48 relative to horizontal is 0 degrees. More-preferably, fuselage orientations are 1 to 4 degree pitches when cruising at greater than 50% of maximum velocity.

Figure 10:
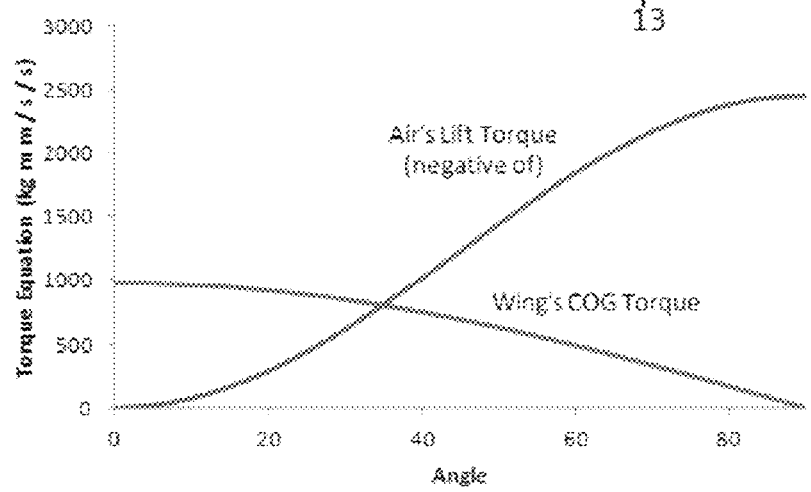
FIG. 10 is an illustrative graph of torque on a lateral shaft toward condition of equal and opposite torque as a passively stable condition of operation at a specified velocity at a set aerodynamic lift from vehicle and wing surfaces.

Critical in the control algorithm is control during transition of steady-state velocities including the transition from hovering to cruising. FIG. 10 illustrated a steady-state condition for the tiltwing angle as a function of velocity and a given fuselage pitch. When changing velocity, it is important to keep the fuselage in a nose up and close to a targeted pitch that is typically between 0 and 10 degrees at moderate to high velocities. FIG. 9 illustrates the preferred algorithm for changing velocities with blocks discussed in the following paragraphs.

Figure 15:
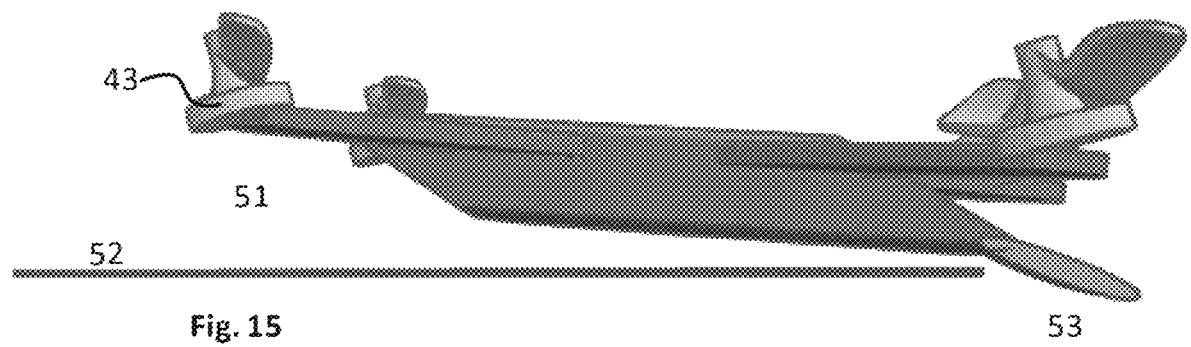
FIG. 15 is a side view an illustration of a cruising aerial quadcopter vehicle of FIG. 13.

Initiate Thrust Change Mechanism—An aspect of this invention is that most of the forward thrust is provided by a passively-adjusting tiltwing 3. A change in the tiltwing 3 position and respective thrust is provided by an initial change referred to as a perturbation. Initiating a change in the tiltwing requires a different source of thrust in the horizontal direction that can be actively controlled, and examples of such devices and actions include: a) changing the pitch setting of the vehicle by changing the thrust of rear thrusters relative to front thrusters, b) adjusting a flap or rudder so as to direct more air rearward, and c) using an actuator to change the tilt on a thruster. By example, a rear flap 53 such as illustrated by FIG. 15 accelerates more are from the rear propellers rearwards as it is actuated from a more-vertical to a more-horizontal location and can be used to initiate forward velocity. By example, a step motor actuator that adjusts the position of a rear thruster 28 (see FIG. 4) is an example an actuator changing the tilt on a thruster.

Tiltwing Passively Adjusts—With a change in velocity, the tiltwing 3 adjusts to a new steady-state angle in response to a different aerodynamic torque on the wing 1. This change in angle leads to a change in both velocity and lift, both arriving at a new steady-state values with the new steady-state angle. This relationship between fuselage pitch, tiltwing 3 angle, and velocity is dependent on the ability of the fuselage, fixed wings, and tiltwing wing aerodynamic lifts to replace thruster lift. Flawed aerodynamic lift designs lead to reaching 0 fuselage pitch prior to attaining targeted velocities; and if the tiltwing 3 angle is still relatively high (e.g. >40 degrees) at this point, increases in energy efficiencies will be minimal.

Fuselage Pitch Tolerance Check—If the fuselage is within tolerance of the pitch set point no feedback control is needed at this point; otherwise, the actuator used to perturb the velocity is changed.

If vehicle pitch is used to perturb velocity, steady-state dynamics exist where decreasing vehicle pitches correspond to decreasing steady-state tiltwing 4 angles, and higher velocities. For this to occur, thrusters attached to the vehicle must be at a forward tilt relative to the fuselage such as the preferred tilt of the rear thrusters of the FIG. 18 quadcopter of 70 to 90 degrees.

Use of pitch control to control velocity requires no actuators beyond a minimum of four (e.g. rotational speed so thrusters). Adjustment of a flap or actuator change of tilt of a thruster require actuators beyond four.

Velocity Tolerance Check—In the case of methods other than pitch control to change the angle of the tiltwing 3, an additional feedback loop may be used to attain a targeted velocity. It should be noted that the fuselage pitch feedback loop is part of the algorithm to keep the fuselage pitch positive and prevent an over-adjustment of an actuator from a nose-down position that is inefficient.

In poor designs, it is possible for a nose-down position to lead to out-of-control decrease in tiltwing angle, increasing loss of lift at the front of the vehicle with decreasing tiltwing angle, and crash the vehicle if not corrected in time. For a tricopter with only three thruster actuators, a rudder having a non-vertical axis of rotation may be used as the fourth actuator so long as that rudder impacts the air flow of at least one thruster. The preferred yaw-control rudder 58 has an axis of rotation at 45 degrees from vertical in the longitudinal-vertical plane. The rudder's 58 axis of rotation is preferably at an angle between 30 and 90 degrees relative to the median longitudinal tangent angle of the fuselage bottom surface.

Controlled Actuators

FIG. 21 summarizes actuators used in control schemes of a quadcopter and tricopter where only four actuators (thrusters are considered actuators) are used to control pitch, yaw, roll, and velocity. For a transition tricopter rudder to achieve yaw control in a tricopter as a fourth actuator, the tricopter rudder must be able to direct air sideways (laterally) from a) at least one thruster for control in hover mode and b) air impacting form forward velocity in cruising mode. The sideways/lateral directing/vectoring is a lateral acceleration and thus provides a force to control yaw. When the rear thrusters are at a fixed angle/pitch less than about 85 degrees (greater than 15 degrees forward), a rudder in the air flow of the rear thrusters will provide needed yaw control.

For a tricopter with two fixed-angle thruster propellers of opposite rotation attached to the fuselage, a sheath radially outside the propeller path of the tricopters third thruster reduces adverse impacts of the third thruster on yaw control.

In a more-general sense, when a rudder is in the air flow of thruster and the axis of rotation of the rudder is at a different angle than the axis of rotation of the thruster, the rudder can provide yaw control. To increase gain as a yaw control, the pitch angle of the rudder may set at an angle other than 90 degrees, such as 110 degrees.

Safety Measure

An observed safety issue of the passively-adjusting tiltwing is that poor designs can lead to rapid decreases in the pitch of the tiltwing with rapid loss of lift and a nose dive when the tiltwing is at the front of the vehicle. To compensate for this issue, preferably, the thruster is attached to the wing its axis of rotation below the tiltwing's axis of rotation. In this design, a rapid increase in thrust of that motor torques the tiltwing toward greater pitch.

Preferred Actuator

A preferred actuator to provide position control is comprised of: a) an electromagnetic coil 64 with control system said coil connected to the fuselage and b) a internal electromagnet core rod 65 said rod having a first end attached to a device for positioning and a second end attached to a spring (or functional equivalent of the spring) and a section of continuously increasing ferromagnetic strength from a first end to a maximum before continuously decreasing to the second end; wherein, a first spring end is attached to the second rod end and the second spring end is attached to the fuselage.

Figure 22:
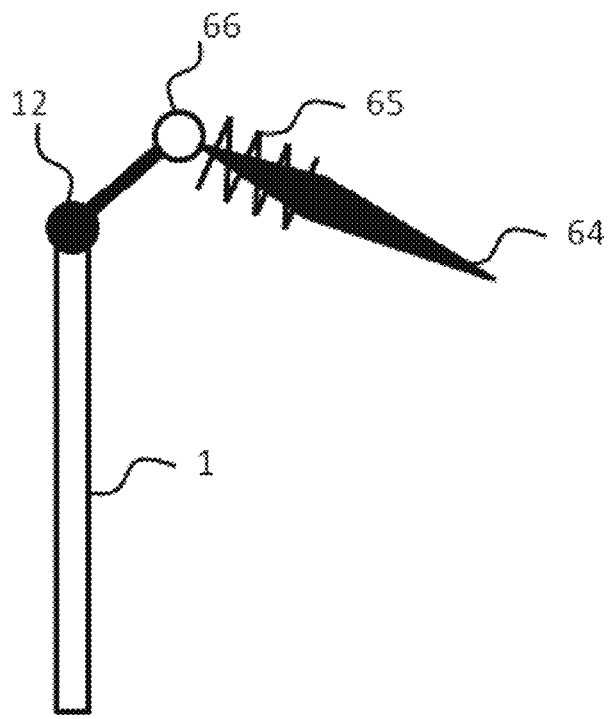
FIG. 22 is an illustration of a positive torque electromagnet actuator for use with tiltwing.

Optionally, the spring may be removed (see FIG. 22) or reduced in tensile force from the preferred actuator in this alternative actuator embodiment, wherein by analogy to FIG. 6, the actuator acts as a damper (analogy to 17), the rod 65 is a moving component (analogy to 18) that moves within a stationary electromagnetic coil 64 (analogy to 19). The first end 66 of the core rod is mechanically connected to provide torque on the tiltwing shaft 12. This optional configuration allows control of the electromagnetic coil to control a torque on the shaft 12. This optional configuration can be used both to dampen and to bias the tiltwing pitch. In this embodiment, application activation of the magnetic coil while at a vertical thrust position biases the tiltwing with negative torque toward a position with a forward thrust vector useful for initial acceleration. When the tiltwing is at or near it's minimum angle/pitch, activation of the coil will bias the tiltwing with a positive torque force useful to pull out of a nose-down loss of forward lift.

Hovercraft Ground Operation

Optionally, thrusters of a multicopter feed air into a pocket on the underside 48 of the fuselage where the pocket is defined by: a) an upper surface being in part the bottom of the fuselage 48 and in part space below at least one thruster, b) a lower surface being earth's surface, c) sides being fences extending along the sides of and below the bottom of the fuselage 48, d) a front freewing with spanwise axis of rotation along the front edge of the bottom of the fuselage said freewing blocked in rotation angle from a pitch of 0 to 90 degrees of pitch, and e) a rear freewing with spanwise axis of rotation below part of a rear thruster and about the same vertical position as the fuselage bottom 48 said freewing blocked in rotation angle from a pitch of 0 to 90 degrees of pitch. The pocket forms when the multicopter is close to the ground. Pressure in the pocket creates a force that biases the front freewing to a 90 degree pitch. Preferably, a connecting arm connects the front freewing to the back freewing in a manner that causes the pitch of the front freewing to match the rear freewing; wherein, the pressure biasing the front freewing to 90 degree pitch compensates for a countering bias of the rear freewing and wherein gravitational or other forces cause both freewings to be near 90 pitch at lower multicopter velocities. As velocities increase, impacting air torques both freewings toward 0 degree pitch positions therein converting the hovering compartment to a liftpath.

Optionally, wheels are mounted into the fence for free longitudinal movement of the multicopter.

Concave-Back Tiltwing

Figure 23:
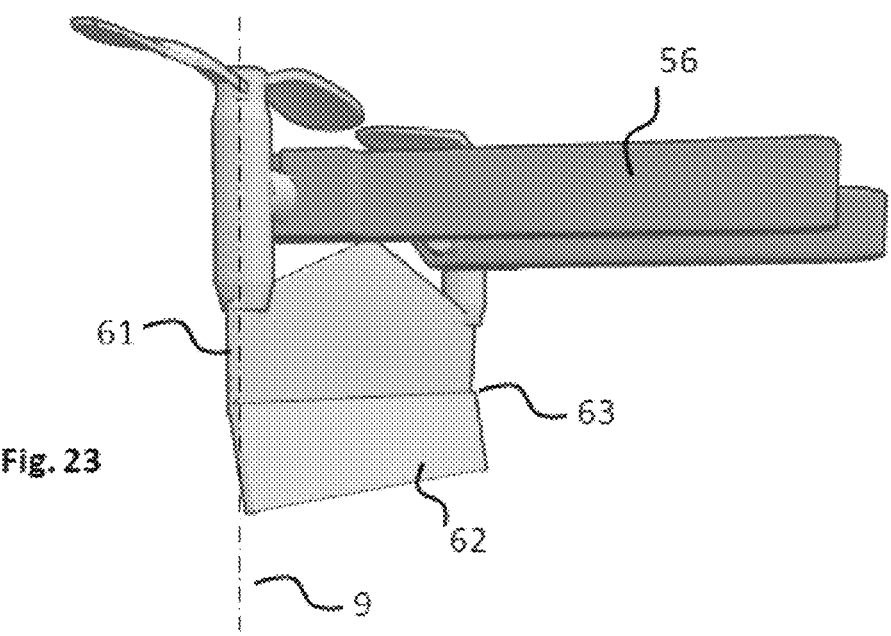
FIG. 23 is an illustration of a tiltwing with a concave backward wing to bias wing in high pitch position at low velocities.

FIG. 23 illustrates a tiltwing designed to apply a third positive torque on the tiltwing at low velocities to bias the wing in a more-vertical position (higher pitch) for takeoff and landing. The thruster's axis of rotation 9 passes through the partial chord of the top part of the wing 61 being about parallel to the averaged surface areas of the top part of the wing. The lower part of the wing 62 as angled toward the arms 56 that connect the tiltwing to the vehicle. More generally, the design is concave 63 toward the fuselage. The connection to the motor is such to minimize prop slipstream on the surfaces of the top half of the wing 61 while hitting the fuselage-side on the lower part of the wing 66.

Preferred asymptotic cord vectors at the top of the wing 1 align with the thruster's axis of rotation 9. Preferred asymptotic cord vectors at the bottom of the wing 1 are at an angle of 2 to 5 degrees relative to the thruster's axis of rotation 9. More generally, and for multicopters, a rudder is in a configuration to laterally deflect slipstreams to augment yaw control.

Freewings

To augment tiltwing and fuselage lift on the fuselage, laterally extending freewings may be attached to the multicopter fuselage. These freewings may be load-bearing, such as bearing batteries to power the thrustmotors. Preferably, rotation of the freewings is blocked to limit operation to a range from about 1 to 90 degrees relative pitch (pitch relative to pitch of fuselage). Preferably, the freewing weight with payload is equal to the aerodynamic lift of the freewing at 60% to 90% of maximum cruising velocity at the lower end of the pitch position range (e.g. 1 degrees). Thus, at velocities greater than that needed to support the weight of the loaded freewing, excess freewing lift is applied as lift force to the fuselage.

The advantage of the freewing embodiment on HS-Drone manifest primarily if the freewing supports a load where the total mass of the freewing (i.e. freewing and load) is equal to the aerodynamic lift of that freewing at an air angle of attack of the freewing between 2 and 20 degrees at a velocity equal to one half the vehicles maximum velocity. For a freewing (and a tiltwing) the air angle of attack is equal to the air angle of attack on the fuselage plus the angle of the freewing relative to the fuselage.

Freewing Actuated Fence

Preferred upper fuselage liftpaths of this invention have fences on both sides of the liftpaths. To prevent the fence from creating high resistance to prop slipstream, two design embodiments are preferred. A first embodiment attaches the fences to a freewing (or tiltwing) such that as the freewing pitch angle decreases, the fence moves block air movement from between the liftpath and the fences. In a second embodiment, the fences are statically attached to the liftpath with air ducts between the fences and the liftpath said air ducts directing air from the liftpath to duct exits below the fences, wherein, as the freewing pitch angle decreases a surface connected to the freewing blocks air flow through the ducts.

Using there two embodiments, two propeller thrusters on opposite side of a fuselage can better accommodate a fuselage corridor from a front to a rear cabin compartment, therein, moving the vehicle center of gravity more rearward and placing more load on a pair of rearward propellers relative to a forward tiltwing.

3D Printing with Thermoset Enhancements 3D printing of HS-Drone components provides for rapid prototyping and easy CAD modification with iterations in prototyping; however, the structural properties of most 3D print filaments and resins are inferior to high performance thermoset polymers. A preferred method to realize the benefits of high performance thermoset polymers is to incorporate injection ducts and cavities in the 3D-printed components wherein the cavities are strategically at locations and shapes to provide extra strength where needed and wherein the ducts connect the cavities to an entrance and exit port for injecting a reacting thermoset resin. The exit ducts may be smaller so as to accommodate exiting air rather than exiting resin.

Illustrative Example 1—Control Strategy, 3-Motor Drone

A three motor drone with left, right, and end thrusters would have the following preferred control strategy as an alternative to previously discussed control schemes.

When thrusters are set for vertical/hovering thrust the 1) left motor speed is linked to an altitude set point (fixed or rate of change), 2) the right motor speed is linked to a roll set point (zero or rate of change), and 3) the end motor speed is linked to a set point for pitch control where pitch indirectly impacts velocity with hover at zero velocity.

When thrusters are set for vertical/hovering thrust the 1) left motor speed is linked to a pitch set point (fixed or rate of change), 2) right motor speed is linked to a yaw set point (zero or rate of change), 3) the end motor speed is linked to a velocity set point (zero or rate of change), and 4) a flap, rudder, or hybrid thereof is linked to a roll set point. Additional flaps and rudder(s) as desired for improved control.

Two passive, stability criteria manifest: 1) zero torque on lateral axis/shaft connect left and right passively-adjusting tiltwings and 2) zero pitch-related torque around vehicle center of gravity. The former is the discussed in the next illustrative example.

On the latter, at a set angle of a passively-adjusting tiltwing and set flap/rudder position; a steady-state velocity is attained and stable angles for the left/right thrusters. At the stable pitch condition (zero pitch-type torque on the vehicle center of gravity), an increase in pitch causes the tail motor to an angle of greater vertical thrust (greater vertical vector component) resulting in a decrease in pitch back to the stable condition. Similarly, a decrease in pitch reduces the vertical thrust at the tail and lowers the tail to the stable condition.

Forces toward stable flight may be augmented by the alternative actuator embodiment and thrusters designed to generate positive torque on a tiltwing.

The embodiments of this invention may be used in control strategies other than this illustrative example.

Illustrative Example 2—Wing Torque

Conventions on Dimensions—Longitudinal dimensions and axes are horizontal in the direction of travel with positive in direction of travel, vertical axes are positive upward, lateral axes are perpendicular to both the vertical and longitudinal axis with positive from right to left when facing the direction of travel. Angles (w) are zero on a longitudinal axis and progress to 90 degrees a vertical axis. Positive torque direction is positive in angle direction.

A vehicle is horizontal when tangent lines to the centroid of the bottom fuselage surface are longitudinally and horizontally tangent. Surface pitch is the longitudinal angle of a surface when the vehicle is horizontal. Vehicle angle of attack is the longitudinal angle of said centroid relative to horizontal. Air's angle of attack depends on vehicle angle of attack, the pitch of a respective surface, and air's velocity vector as dependent on vehicle velocity and the impact of motor thrust(s) on air's flow.

Torques on Lateral Thrust-Wing Axis—For wing movement from 0 to 90 degrees where the wing's center of gravity (cg) is located below and/or behind the lateral axis of rotation, gravity creates a positive torque on the wing/shaft. Where the effective lift centroid of air is located below and/or behind the lateral axis of rotation, increased longitudinal vehicle velocity (vel) creates a negative torque on the wing/shaft. Where the axis of rotation of the thruster passes through the wing's lateral axis, the thrust of the motor has no impact on torque (although the air movement over/under the wing may have an impact on torque).

For a thin, flat wing, the two torque approximation equations are:

$$\tau, cog = g\, M\, Lc\, \cos(\omega) \qquad \text{Equation 1}$$

$$-\tau, vel = LL \rho A\, v\, v\, \sin(\omega)\sin(\omega) \qquad \text{Equation 2}$$

where:

$\tau$ is torque of center of gravity or air velocity (kg*m*m/s/s).

$L_C$ is distance from the wing's center of gravity to the lateral axis (positive)

$\rho$ is air's density (specified at 1.225 kg/m/m/m)

A is cross-sectional area (m*m)

v is velocity (m/s)

$\omega$ is angle from vertical g gravitational acceleration (9.81 m/s/s)

M is mass of the wing

LL is distance from air impact (surface are) centroid to the lateral axis (positive).

Lc/LL is the tiltwing centroid ratio.

Figure 11:
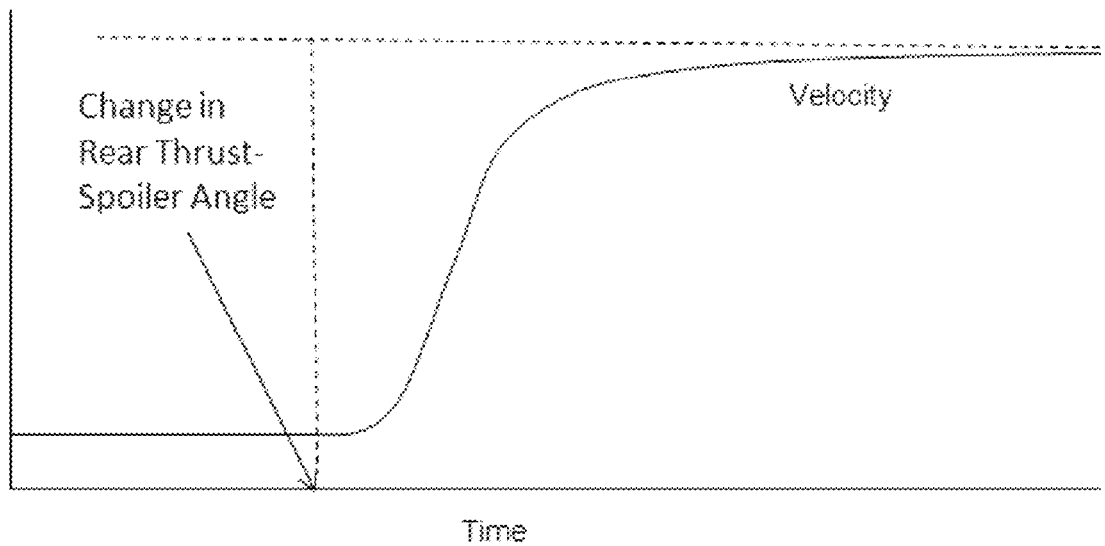
FIG. 11 is an illustrative graph of over-damped passive response of velocity to a change in angle of a tail thruster under the constraint of power to maintain constant altitude.

Given: 1) wing mass of 200 kg per square meter, 2) wing center of gravity 0.5 meter below lateral axis (vertical orientation), 3) motor rotation axis intersecting the lateral axis, 4) the wing is a flat thin plate with surface geometric center 1 meter below the lateral axis (vertical orientation), and 5) different curves are calculated for different longitudinal velocities.

$$1=(\rho v \; v/g)(LL/Lc)(A/M)(\sin(\omega)\sin(\omega)/\cos(w)) \quad \text{Equation 3}$$

with unknowns v and w where w is a function of (passively set by) v. FIG. 11 illustrates an example calculation of torques (Equations 1 and 2) for a velocity of 100 mph (44.7 m/s). In this example, a velocity of 44.7 m/s (100 mph) leads to an angle of 35 degrees for the passively-adjusting tiltwing.

A series of solutions to Equation 3 leads to: 90 (deg), 0 (m/s Vel); 65.5, 20; 38.7, 40; 20.1, 80; 35, 44.7 (100 mph); 12.1, 134 (300 mph); 7.3, 223 (500 mph).

This example illustrates passively stable control of angles of passively-adjusting tiltwings in the transition from vertical thrust configuration to horizontal thrust configuration.

In this example, the tiltwing centroid ratio (i.e. Lc/LL) is 0.5; changing this ratio to 0.125 changes the angle solution to 6.0 degrees rather than 12.1 degree at a cruising speed of 300 mph.

A variety of factors impact this angle including the impact of thruster's air flow over/under the wing.

Critical analysis of the data—At velocities of 100, 300, and 500 mph, the lift is estimated at 143, 470, and 787 kg/m^2 of surface area which is far greater than the specific mass of the wing (set at 200 kg per m^2). Preferred operation is with the lifting-body fuselage and wing operating at the same angle of attack, but with these large lifts on the wing, the fuselage is operating at a much lower angle of attack (which is preferably set by the tail rudder).

The preferred engineering solution to this issue is to operate with air angles of attack as follows: about 1 degree for the rear third of the fuselage (both upper and lower surfaces), about 2 degrees for the front third of the vehicle, and about 3 degrees for passively-adjusting passively-adjusting tiltwings at the targeted design cruise velocity. The degrees of freedom to achieve this are: lateral axis location, weight distribution on the passively-adjusting tiltwing, and shape of the passively-adjusting tiltwing. This design provides both stable flight and high L:D ratios.

Limits of Performance Discussion—Toward the horizontal condition, smaller angles off horizontal lead to ever-decreasing lift with zero never being attained. Preferably, stops prevent the wing from going past alignment of lift-generating surfaces with the fuselage's prominent lift-generating surfaces wherein cruising velocities are preferably at fuselage/wing average angles of attach between about 1 and 3 degrees leading to high lift:drag ratios.

Centroid Parameters

A centroid is a location, and for purposes of defining the tiltwing centroid ratio (i.e. Lc/LL), it is a location in z (vertical) and y (lateral/spanwise) coordinates of a tiltwing in a nose-up (vertical) position. Lc is the distance between the axis of rotation 4 and the mass centroid; it depends only on the z coordinate of the mass centroid. LLA is the distance between the axis of rotation 4 and the area centroid; it depends only on the z coordinate of the area centroid. For purposes herein, LL (aerodynamic lift centroid) is approximated as LLA (vertical-lateral area centroid tiltwing in nose-up position). The value of a coordinate is equal to a first integral divided by a second integral. This first integral of the z-coordinate calculation of a mass centroid is the integral of "all mass of the object in the differential distance dz multiplied times the coordinate z", and the second integral is the integral of "all mass of the object in the differential distance dz". This first integral of the z-coordinate calculation of a area centroid is the integral of "all mass of the object in the differential distance dz multiplied times the coordinate z", and the second integral is the integral of "all mass of the object in the differential distance dz".

Illustrative Example 3—Pitch, Yaw, and Roll Stability

The preferred aerial vehicle design has a fuselage pitch that can be set relatively independent of the wing (passively-adjusting tiltwing) pitch; and, the vehicle can operate at that pitch during all transit unlike fixed wing aircraft that operate at a higher fuselage pitch during takeoff and landing.

The preferred fuselage has a substantially flat bottom and top with tapered (pointed as necessary) front and back; wherein, the upper and lower surfaces are substantially parallel except at the tapers/points.

For pitch stability, the pitch of the back (third) of the aircraft is at a lower pitch than the front (third) of the aircraft resulting a lower angle of attack in the back (third, preferably set at about 0.5 degrees (preferably 0.5 to 1.5 degrees) than the front (third, at about 2 degrees, preferably 2 to 2.5 degrees). At these small angles, L:D is inversely related to the attack angle; and so, the change in lift due to a pitch disturbance (derivative) of the back of this design is about four times that of the front. A disturbance that bumps fuselage pitch upward is immediately offset by a larger relative increase in lift at the back of the aircraft that produces a (negative) torque countering the bump. A disturbance that bumps fuselage pitch downward produces a (positive) torque countering the bump.

Passively-adjusting tiltwings that freely rotate on a lateral axis would also move to naturally move the vehicle pitch back to the initial set point.

Yaw stability can be increased as necessary by placing a thruster at the front of the vehicle rather than the rear.

Roll stability can be increased as necessary by extending tail left and right flaps laterally (extended wings) at the tail of the aircraft and behind the passively-adjusting tiltwings.

Illustrative Example 4—Demonstration of Passively-Adjusting Tiltwing

A six ounce quadcopter drone with for six-inch propellers and a front passively-adjusting tiltwing was fabricated by 3D printing the fuselage. Rear propellers were at an angle of 60 degrees relative pitch. The front passively-adjusting tiltwing was set to vary from about 55 degrees to about 75 degrees relative pitch. The quadcopter hovered with the tiltwing at about the 75 degree position. With instilling of forward momentum (increasing vehicle pitch) the vehicle moved forward and with increasing acceleration, the tiltwing moved to about 55 degrees with further forward acceleration. Sometimes, the quadcopter would initially lose altitude (nose slightly down) until speed was adequate where at higher speeds it maintained altitude in a slight nose up position.

Also, it was observed over a series of tests on similar drones that the tiltwing exhibited oscillatory (unstable) behavior when hovering with the tiltwing pitch varying form about 65 degrees (vertical wing chord since the fuselage was at a pitch of about 25 degrees) to 45 degrees. Oscillation was attributed to unstable control settings and wind disturbances. A rubber band with a first end attached to the top of the tiltwing shaft and the second end attached to the fuselage behind the tiltwing shaft eliminates oscillation with moderate tension on the rubber band.

Illustrative Example 5—Demonstration of Tiltwing Dynamics

A six ounce quadcopter drone with for six-inch propellers and a front passively-adjusting tiltwing was fabricated by 3D printing the fuselage and of a design similar to that of FIG. 18. The fuselage was bolted to a platform and positioned so the control card was level. A 4-channel 2.4 GHz controller send a signal to the quadcopter drone to initiate flight followed by a signal to lower altitude wherein the signal to lower the altitude reduced the engine rpms of all four motors of the drone. The tiltwing was initially vertical with the fuselage body at about 20 degrees of pitch. Observations were made on drone performance at various engine rpms and with various headwinds as follows: a) higher motor rpms on the tiltwing thrusters produced higher negative torques with resulting decrease in tiltwing pitch, b) incrementally increased head winds produced incrementally higher (absolute sense) magnitude negative torques on the tiltwing and resulting lower pitches of the tiltwing, and c) no unstable oscillation was observed with the tiltwing.

The following conclusions were made in view of Illustrative Examples 4 and 5: a) prop slipstream blocked by the arms 56 reduced pressure on the back side of the wing 1 relative to the front side of the wing 1 resulting in increasing magnitude negative torque with increasing tiltwing thruster speeds, b) dampening torque forces are needed to reduce oscillation of the tiltwing where the oscillation is due to tiltwing controller feedback and wind disturbances, c) gravity tends to be the dominant force which keeps a tiltwing near vertical at low to moderate tiltwing thruster rpms and low velocities of air impacting the tiltwing, and d) a rubber band with a first end attached to the top of the tiltwing shaft and the second end attached to the fuselage behind the tiltwing shaft produces a positive torque force on the tiltwing and eliminates oscillation with moderate tension on the rubber band.

Illustrative Example 6 Observations on Tiltwing Centroid Ratio

Fifteen passively-adjusting tiltdrone quadcopters were fabricated using 3D printed fuselages with a range of tiltwing configurations including prop tiltwings similar to those of FIGS. 17 and 18. The single tiltwing design of FIG. 18 was more robust against breakage and larger areas required less velocity to transition. Both types of tiltwings exhibited good flight and transition. The following problems were encountered and had to be overcome:

a) at times inadequate forward velocity failed to lead to passive adjusting of the tiltwing with identified solutions of i) setting the rear propellers at angles of 15 and of 30 degrees (relative to fuselage bottom 48) allowing a better angle of attack for the rear props to provide thrust while maintaining a nose-up pitch for the lifting body fuselage, ii) flaps to direct prop slipstream rearwards, and iii) adjustment of vehicle pitch to negative-pitch nose-down positions which required recovery to positive pitch for cruising was difficult but possible when velocities were sufficiently fast and was achieved by faster rotations of forward relative to rear propellers;

b) Per observation a).i, nose-down flight was generally undesirable because such flight produced negative lift from the fuselage body and defeats the purpose of transition to fixed-wing flight, wherein, at times the transition of the tiltwing occurred too quickly with loss of front lift and diving of the vehicle with several crashes there-from. Solutions to this problem include: i) increase the tiltwings centroid ratio (i.e. Lc/LL) wherein this Tiltwing centroid ratio was experimentally varied from about 0.5 to 0.8 with maximum velocities of about 15 mph with more reliable performance at 0.80 ratio, ii) the areodynamic lift of the fuselage 14, fixed wings, and tiltwing 3 are too low for the corresponding tiltwing angle transition, and iii) the controller is not sufficiently quick to adjust the thrust of the tiltwing thrusters to compensate for changing vectoring that reduces the vertical component of lift of tiltwing thrusters.

Targeted Tiltwing centroid ratio ratios (are based on 45 degrees tiltwing pitch at 10% of maximum velocity which translates to 1.0 (Tiltwing centroid ratio) at 200 mph (max), 0.1 at 20 mph (max), and 1.5 at 300 mph (max). Preferred ranges are 0.02 to 0.5 at 20 mph (max), 0.2 to 5.0 at 200 mph (max), and 0.3 to 7.5 at 300 mph (max), more-preferred are 0.04 to 0.25, 0.4 to 2.5, and 0.6 to 3.75 respectively. As far as a general target for applications in the 50 to 400 mph maximum velocities, the preferred range of tiltwing centroid ratios is from 0.2 to 5. More preferably, for multicopters with maximum cruising velocities between 100 and 350 mph the tiltwing centroid ratio is between 0.5 and 3.0.

Solutions to the "b).i" through "b).iii" include better matching Tiltwing centroid ratio to the design, adding additional lift surfaces to the fuselage and any fixed wings, and adding an additional source (e.g. third) of positive torque force that acts on the wing a lower velocities.

c) Recovery from a nose-down position can be difficult, and one approach to prevent the nose-down crash is to adjust the control algorithm to minimize the amount of negative nose pitch that is allowed during standard operation. Another control algorithm solution is to provide a recovery control sub-algorithm specifically designed to transition to a nose-up position when a targeted velocity is reached.

As previously discussed, for a given aerodynamic vehicle design (i.e. vehicle/tiltwing lift dynamics) there is a stable flight velocity corresponding to each tiltwing angle which has utility toward improving energy efficiency. This functional relationship continues until the median fuselage lifting body surface attains an angle of attack with the air (which is fuselage pitch, herein) of about 2 degrees; below about 2 degrees pitch fuselage surfaces increasingly contributes negatively to lift. The following paragraphs discuss this "Functional Relationship".

In this Functional Relationship (for a given vehicle design) there is a minimum tiltwing angle (relative to fuselage), below which the fuselage pitch becomes less than about 2 degrees; shortly thereafter, further velocities lead to lower fuselage-generated lift (eventually negative fuselage lift), and wherein, at some point the tiltwing (thruster and wing 1) cannot compensate for the fuselage. To avoid this situation, the tiltwing angular movement is blocked to prevent going below a minimum value specific to inadequate fuselage lifting-body designs (including fixed wing lift).

In this Functional Relationship, it is possible the quadcopter or tricopter will attain a nose-down position (negative fuselage pitch) prior to reaching sufficient velocity for the tiltwing to adjust to the stable position corresponding to that velocity. When tiltwing angular adjustment finally occurs, it can occur in a nose-down position where i) tiltwing thruster lifts become inadequate and ii) vehicle aerodynamic lift is inadequate. This position is recoverable by i) first maximizing the thrust of the front (tiltwing) thrusters to maximize their respective lift vectors b) reducing rear-propeller lift to engage positive fuselage lift and enable a better lifting pitch for the fuselage. This approach can be used to accelerate faster than otherwise possible, but only with allowance for slightly nose-down position.

In this Functional Relationship, for all passively adjusting tiltwing designs, there is a sufficiently nose-down position where the front tiltwing fully engages and has a negative lift vector rather than a positive lift vector. A shut down and parachute recovery of the vehicle is one option. Addition of flap actuators to pull nose up combined with shutdown of any thrusters with negative thrust vectors is also a solution provided there is adequate altitude for the flaps to change; this teaches toward a tricopter design with a tilted-pitch rudder 58. Also, designs with vehicle centers of gravity behind the aerodynamic center can also facilitate recovery with full shutdown of all thrusters. Also, a positive tiltwing torque actuator such as the electromagnet damper can be used to facilitate recovery.

Illustrative Example 7—Critical Comparison to Baldwin U.S. Pat. No. 7,059,562

Baldwin describes: "A flying craft comprising: (a) a suspension structure having a first end and a second end; (b) a lift unit coupled to the first end of the suspension structure including: (1) at least one pair of torque producing propulsion systems including counter-rotating propellers, (2) wherein the lift unit is freely rotatable, within a predetermined angular range about only one rotational axis perpendicular to an axis passing through the first and second ends of the suspension structure." Also, Baldwing identifies, "Pitch control surface 280, in combination with the energized airflow for torque-production propulsion subsystems 252 and 256 having propellers 254 and 258, provides sufficient pitch authority to transition lift unit 204 between vertical and horizontal flight." Embodiments of Baldwin are incorporated herein by reference.

A comparison of HS-Drone [Baldwin] reveals a tiltwing 4 [20], wing 1 [44] as part of the tiltwing, use of an arm 56 [64, 62] to connect the fuselage 14 [52] to the tiltwing, and bearings 13 [26, 27] as a mechanical connection. However, despite the similarities, these similarities are substantially only the passively-adjusting tiltwing embodiment. The purpose of HS-Drone's tiltwing is fundamentally different than the tiltwing of Baldwin. The purpose of HS-Drone's tiltwing is to transition 50% or less of the thrust in a multicopter vehicle; this leads to differences where HS-Drone: a) tiltwing(s) has/have 50% or less of vehicle's total takeoff thrust, b) tiltwing(s) has/have 50% or less of vehicle's total fuselage/wing-based lift, c) fuselage is an efficient lifting body with specified cruising pitch angles, d) "third positive torque" is specified as important for tiltwing control, e) preferred range of tiltwing centroid ratios is specified, f) VTOL is achieved without more than four actuators (related to one bearing axis rather than two), g) control approach on VTOL with multiple thrusters is specified, h) control approach using only four actuators (including thrusters) is specified, and i) tricopter and quadcopter configurations are specified.

Minimum critical loading of a tiltwing is necessary for good performance. That loading increases with vehicle maximum velocity, and more specifically, the design velocity for transition from hover to cruise, for which, a tiltwing angle (relative to fuselage) of 45 degrees is a good design point. When the tiltwing loading is too low, the inertia of the wing is too low and the transition more-prone to instability.

Illustrative Example 8—Impact of Tiltwing Centroid Ratio

An HS-Drone configuration of FIG. 18 was evaluated at a size as specified in Illustrative Examples 5 and 6. The tiltwing had an area of 28.14 sq. in, a span of 7 in., and a total cord of 6 in. including the thruster motors (but not propellers). The bottom of the wing was 7 in. in span and 2.7 in. in height with two 1.4" extensions to the bearing and motor mounts. LL was 3.25 in and the tiltwing centroid ratio (Lc:LL) was varied at four values. Experimental studies were conducted to identify the velocity (mph) when a tiltwing angle 45 degrees (relative to horizontal) was reached. Results include Lc/LL:tiltwing mass (g):Velocity (mph) are as follows: 0.3:46.3:8; 0.77:77:14; 0.92:96:18; and 1.08:192:32. At higher values of the tiltwing centroid ratio, the wing had less vibration and increased stability. This data is consistent with a 200 mph maximum velocity design where at 20 mph a tiltwing centroid ratio of 1.0 provides an angle of 45 degrees. Propeller weights were taken into account, but propeller resistance was not, and so, the tiltwing centroid ratio of 1.0 should be corrected to about 1.2.

The invention claimed is:

1. A multicopter comprising: a fuselage, a fuselage first thruster, a wing (1), and a first tiltwing thruster (2) statically connected to the wing (1) forming a passively-adjusting tiltwing (3),
    wherein a bearing mechanically couples the tiltwing and the fuselage said tiltwing freely rotatable relative to the fuselage within a predetermined angular range around a tiltwing axis (4),
    said tiltwing having i) a mass centroid, ii) an area centroid, iii) a mass centroid torque distance being the distance between the mass centroid and the tiltwing axis, iv) an area centroid torque distance being the distance between the area centroid and the tiltwing axis, and v) a tiltwing centroid ratio said centroid ratio being the mass centroid torque distance divided by the area centroid torque distance,
    wherein the value of the tiltwing centroid ratio is between 0.2 and 5,
    wherein aerodynamic and gravitational forces produce torques about the tiltwing axis said torques comprising a positive tiltwing center of gravity force torque, a negative impacting air aerodynamic force torque, and a third positive torque, and
    wherein thrust of the fuselage first thruster relative to thrust of the first tiltwing thruster controls the pitch of the fuselage.

2. The multicopter of claim 1 wherein the third positive torque is one from a list comprising
    a) torque resultant of force of the first tiltwing thruster said first tiltwing thruster having a motor axis of rotation below the tiltwing axis,
    b) torque resultant of a spring having a first end connected to the fuselage and a second end connected to the tiltwing,
    c) torque resultant of a variable force electromagnetic damper with a first end connected to the fuselage and a second end connected to the tiltwing, and
    d) torque resultant of tiltwing thruster prop slipstream impacting a back-side concave surface of the wing (1).

3. The multicopter of claim 1 comprising a total vertical takeoff thrust and a total multicopter weight wherein thrust from the tiltwing during vertical takeoff is less than half the total vertical takeoff thrust and lift force from the tiltwing is less than half the total multicopter weight.

4. The multicopter of claim 1 wherein for multicopters with maximum cruising velocities between 100 and 350 mph the tiltwing centroid ratio is between 0.5 and 3.0.

5. The multicopter of claim 1 comprising a fuselage second thruster said first and fuselage second thrusters being electric motors turning propellers.

6. The multicopter of claim 1 comprising a fuselage second thruster wherein the fuselage first and second thrusters are set at an angle between 50 and 85 degrees relative to the median angle of the lower surface of the fuselage.

7. The multicopter of claim 1 said first tiltwing thruster (2) having a motor axis center of rotation (9) and a tiltwing axis (4) center of rotation wherein the motor axis (9) is below the tiltwing axis (4) said passively-adjusting tiltwing having a center of gravity where in the vertical thrust configuration (5) said center of gravity is at or below the tiltwing axis (4), and wherein, a thrust of the tiltwing motor (2) produces a positive torque around the tiltwing axis (4) said positive torque producing force toward the vertical thrust configuration (5), gravity action on the center of gravity generates a zero to positive torque around the tiltwing axis (4), and the impacting air from horizontal flight produces a negative torque around the tiltwing axis (4).

8. The multicopter of claim 1 comprising a plurality of longitudinally-extending lift-generating surfaces (27) forming a lift path comprising:

a cabin, said cabin having an average cabin length, a cabin average width, and a cabin average height;

the lift path having a width greater than six tenths the cabin average width and said lift path having a length greater than seven tenths the cabin average length;

said lift path having a front third with a front average pitch, a back third with a back average pitch, and a middle third with a middle average pitch; wherein the back average pitch is 1 to 3 degrees less than the front average pitch.

9. A multicopter comprising a single front passively-adjusting tiltwing in front of a single fuselage, at least one rear thruster, and a plurality of longitudinally-extending lift-generating surfaces (27) forming a total aerodynamic lift surface area;

the plurality of longitudinally-extending lift-generating surfaces comprising the fuselage (46), the front passively-adjusting tiltwing (3), and an arm (56) mechanically connecting the front passively-adjusting tiltwing to the fuselage; wherein the plurality of longitudinally-extending lift-generating surfaces forms a lift path wherein lift provided by the front passively-adjusting tiltwing is less than half the lift provided by the total aerodynamic lift surface area.

10. The multicopter of claim 9 wherein the front passively-adjusting tiltwing is freely rotatable relative to the fuselage within a predetermined angular range around a tiltwing axis (4).

11. The multicopter of claim 9 comprising two thrusters on the front passively-adjusting tiltwing, two arms mechanically connecting the fuselage to the front passively-adjusting tiltwing, and wherein the at least on rear thruster is two rear thrusters said two rear thrusters set at an angle relative to the fuselage.

* * * * *